(12) United States Patent
Imamura

(10) Patent No.: US 8,024,090 B2
(45) Date of Patent: Sep. 20, 2011

(54) VEHICLE STEERING SYSTEM

(75) Inventor: Kenji Imamura, Kosai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 291 days.

(21) Appl. No.: 12/377,965

(22) PCT Filed: Feb. 28, 2008

(86) PCT No.: PCT/IB2008/000435
§ 371 (c)(1),
(2), (4) Date: Feb. 18, 2009

(87) PCT Pub. No.: WO2008/107757
PCT Pub. Date: Sep. 12, 2008

(65) Prior Publication Data
US 2010/0168962 A1 Jul. 1, 2010

(30) Foreign Application Priority Data
Mar. 2, 2007 (JP) ................................. 2007-052343

(51) Int. Cl.
*B62D 1/06* (2006.01)

(52) U.S. Cl. ............................. 701/45; 280/777; 74/552

(58) Field of Classification Search .................... 701/36, 701/41, 44, 45; 74/552
See application file for complete search history.

(56) References Cited

U.S. PATENT DOCUMENTS
7,004,048 B2 * 2/2006 Kobayashi et al. ............. 74/552

FOREIGN PATENT DOCUMENTS

| | | | |
|---|---|---|---|
| DE | 10144079 A1 * | 3/2003 | |
| DE | 103 16 350 | 10/2004 | |
| DE | 10316350 A1 * | 10/2004 | |
| FR | 792 324 | 12/1935 | |
| JP | 11 245759 | 9/1999 | |
| JP | 11 342819 | 12/1999 | |
| JP | 2003 118586 | 4/2003 | |
| JP | 2004 338448 | 12/2004 | |
| JP | 2005 329864 | 12/2005 | |

(Continued)

OTHER PUBLICATIONS

Machine Translation of KR 2006022391 A.*

(Continued)

*Primary Examiner* — Thomas Black
*Assistant Examiner* — Sara Lewandroski
(74) *Attorney, Agent, or Firm* — Oblon, Spivak, McClelland, Maier & Neustadt, L.L.P.

(57) ABSTRACT

A vehicle steering system includes: a steeling operation member (20) that includes an auxiliary grip portion (154, 156) the position of which is changed between the expected grip position, in which the auxiliary grip portion is expected to be gripped by a driver during a steering operation, and the retracted position, which is reached when the auxiliary grip portion has been retracted from the expected grip position and in which the auxiliary grip portion is not expected to be gripped by the driver during the steering operation; an auxiliary-grip-portion position changing device that changes the position of the auxiliary grip portion between the expected grip position and the retracted position; an airbag device that deploys an airbag toward the driver; and a control unit that controls an operation of the auxiliary-grip-portion position changing device.

15 Claims, 16 Drawing Sheets

FOREIGN PATENT DOCUMENTS

| | | | |
|---|---|---|---|
| JP | 2005329864 A | * | 12/2005 |
| KR | 2006022391 A | * | 3/2006 |

OTHER PUBLICATIONS

Machine Translation of JP 2005329864 A.*

Machine Translation of DE 10316350 A1 (includes Bibliography, Claims and Description).*
Machine Translation of DE 10144079 A1 (includes Bibliography and Description).*

* cited by examiner

F I G . 3
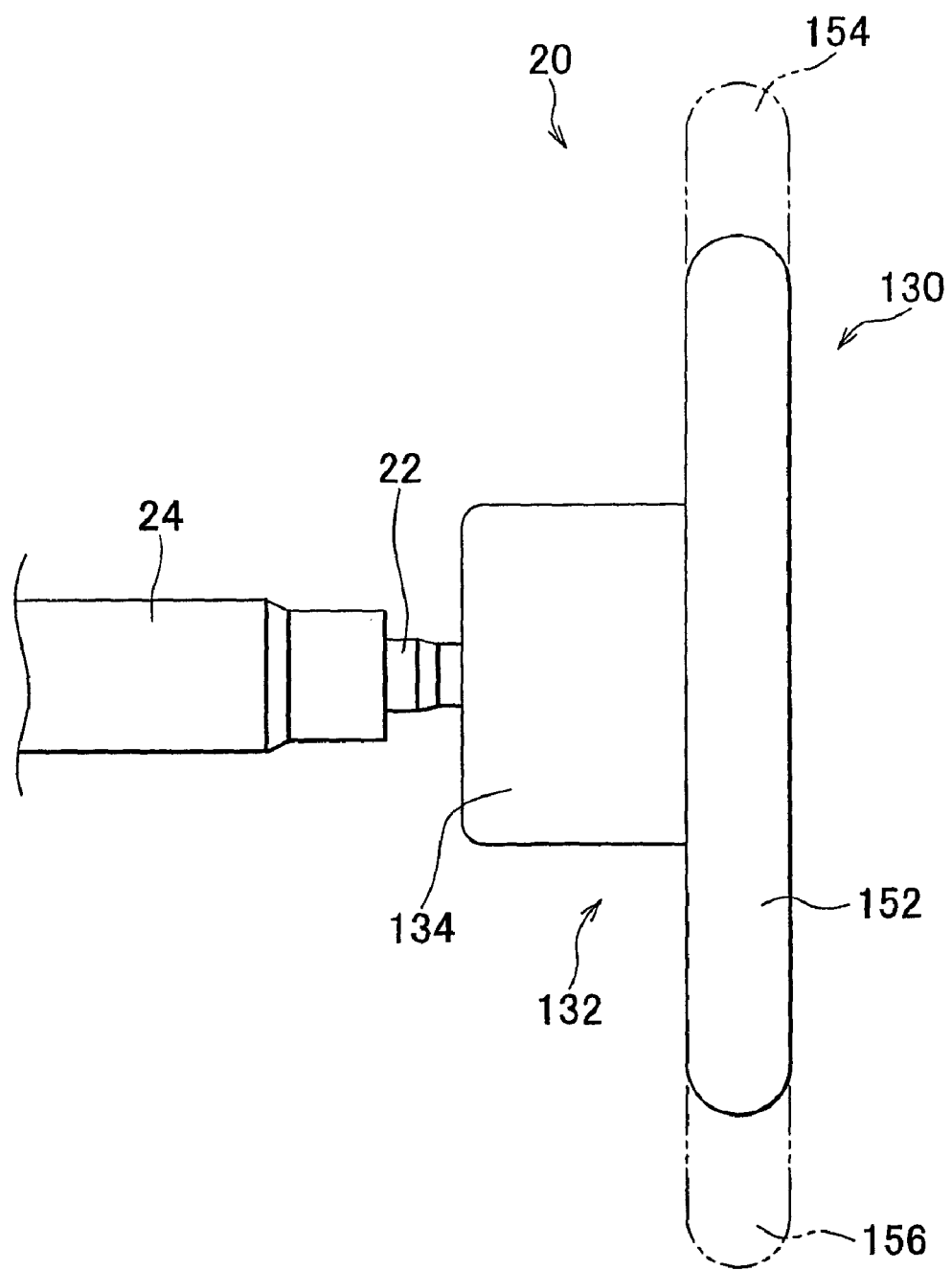

F I G . 4
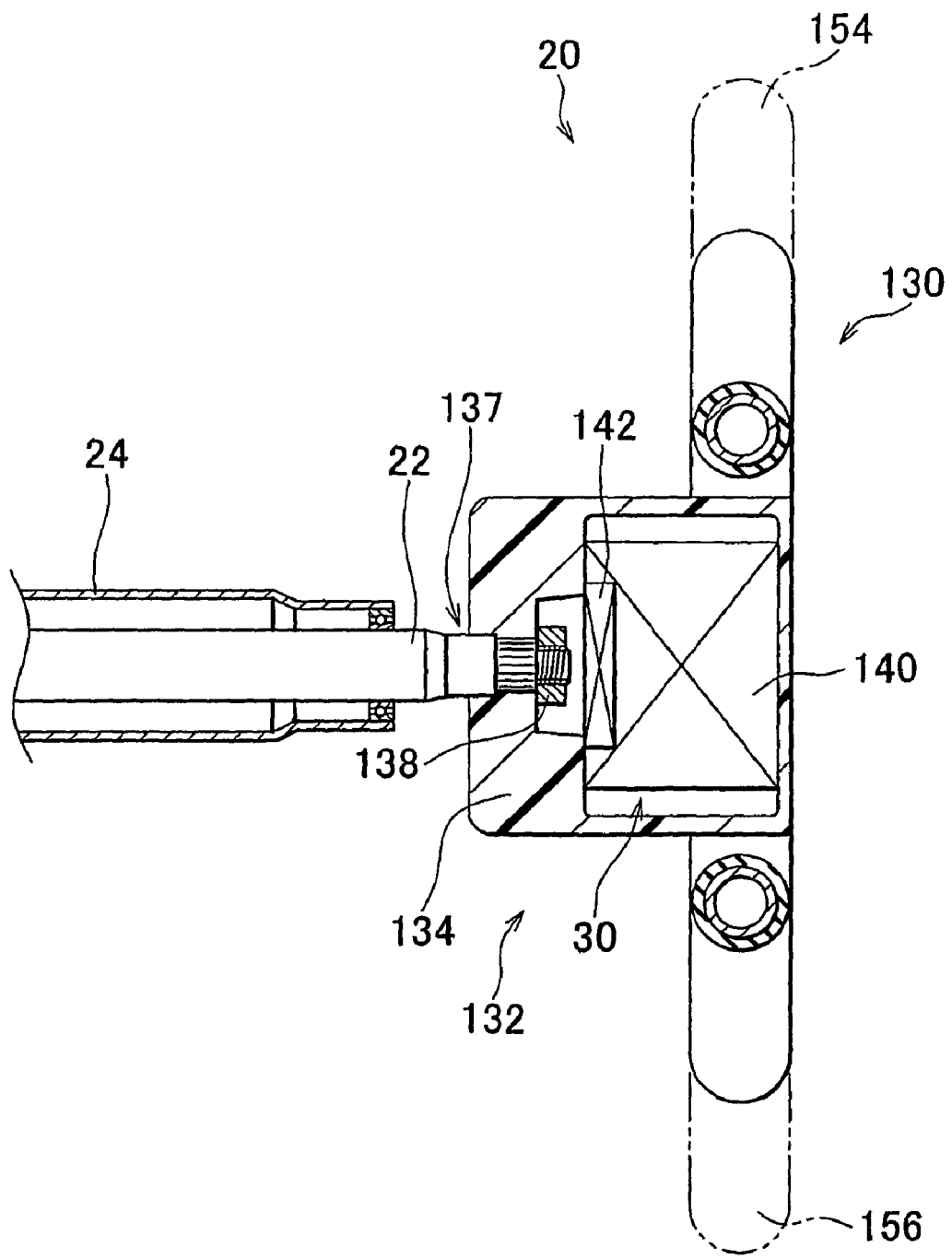

F I G . 16
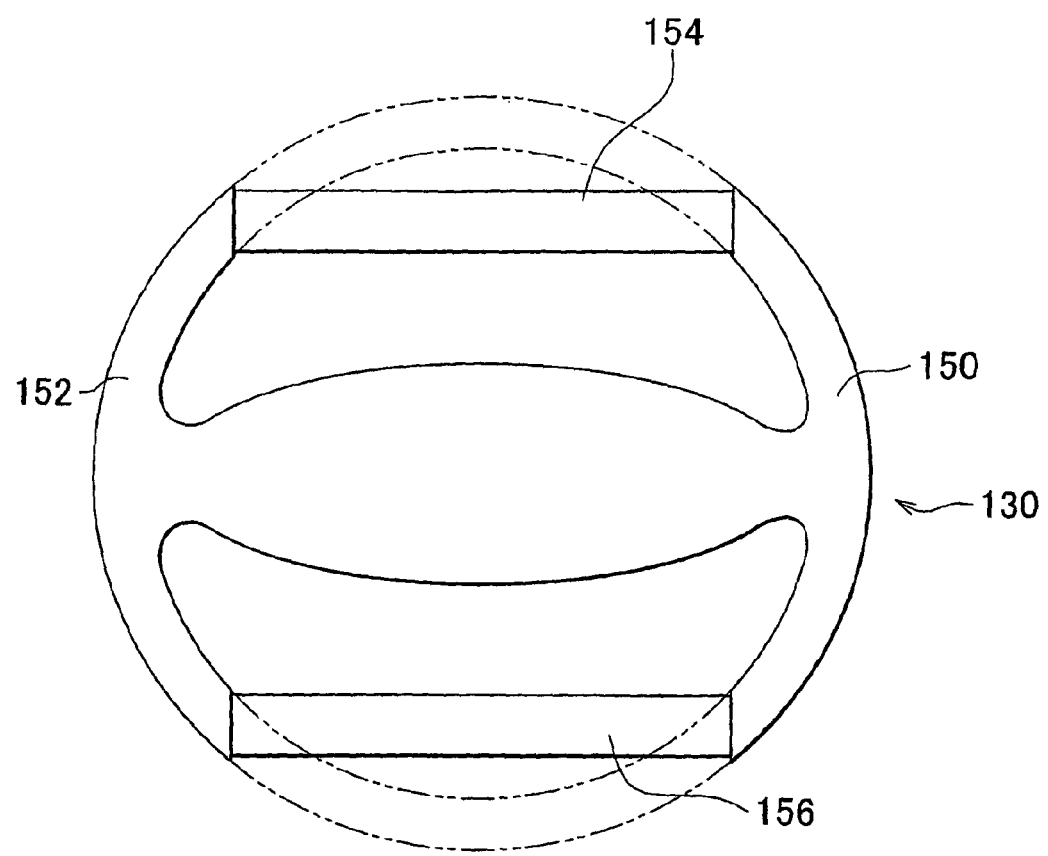

VEHICLE STEERING SYSTEM

BACKGROUND OF THE INVENTION

1. Field of Invention

The invention relates generally to a steering system mounted in a vehicle, and, more specifically, to a steering system provided with a steering operation member that is rotated to steer wheels.

2. Description of Related Art

In recent years, vehicle steering systems such as those described in Japanese Patent Application Publications No. 11-342819 (JP-A-11-342819), 2004-338448 (JP-A-2004-338448), 2003-118586 (JP-A-2003-118586), and 2005-329864 (2005-329864), more specifically, vehicle steering systems including a shape-changeable steering operation member have been under development.

The steering operation member of the vehicle steering systems described in the above-described publications is allowed to change its shape depending on, for example, various circumstances. However, because the steering systems including such a steering operation member are still under development, they still have plenty of room for improvement. It is therefore considered that the practical utility of the steering systems will be enhanced by introducing various refinements into these steering systems.

SUMMARY OF THE INVENTION

The invention provides a vehicle steering system that has an increased practical utility.

Therefore, the vehicle steering system according to the invention includes: a steering operation member that includes an auxiliary grip portion the position of which is changed between the expected grip position, in which the auxiliary grip portion is expected to be gripped by a driver during a steering operation, and the retracted position, which is reached when the auxiliary grip portion has been retracted from the expected grip position and in which the auxiliary grip portion is not expected to be gripped by the driver during the steering operation; an auxiliary-grip-portion position changing device that changes the position of the auxiliary grip portion; and an airbag device. If the auxiliary grip portion is in the retracted position when the airbag needs to be deployed, the position of the auxiliary grip portion is changed to the expected grip position.

In a steering system including a steering operation member that has an auxiliary grip portion, if the auxiliary grip portion is in a retracted position when the airbag needs to be deployed, an airbag device may fail to exhibit its shock-relaxing performance at a sufficient level. However, with the steering system according to the invention, for example, the auxiliary grip portion allows the airbag device to exhibit its shock-relaxing performance at a sufficient level during airbag deployment.

Multiple aspects of the invention will be exemplified and described below. Like claims, the aspects of the invention will be given reference numbers, and each aspect of the invention will be described with reference to another aspect of the invention when needed. The descriptions of the aspects of the invention will be provided in this manner in order to just facilitate the understanding of the aspects of the invention. Note that, the combinations of the configurations are not limited to those described in the aspects of the invention. Namely, the aspects of the invention should be understood with reference to the description of each aspect of the invention, the description of the embodiment of the invention, etc. As long as the aspects of the invention are understood in the above-described manner, the invention may be implemented in an aspect that is made by adding a new configuration to each aspect of the invention described below, or by removing a configuration from each aspect of the invention described below.

(1) A first aspect of the invention relates to a vehicle steering system including a steering wheel that includes: a steering rim; and a rim shape changing mechanism that allows one portion of the steering rim to move with respect to another portion of the steering rim to change the shape of the steering rim between a first shape that is an annular shape and a second shape that is a partially annular shape.

A steering operation member (hereinafter, referred to as "operation member" where appropriate) provided in steering systems according to related arts is usually formed of a steering wheel having an annular steering rim (hereinafter, referred to as "rim" where appropriate). In recent years, an operation member including a rim having a shape that is a partially annular shape or an annular shape in which at least one portion is concave, have been under development in order to allow a driver to check meters and to get on or off the vehicle more easily. However, if the rim is formed into a deformed annular shape, the driver sometimes has difficulty in rotating the operation member. In contrast, if the shape of the steering rim is allowed to change between an annular shape and a partially annular shape, as in the first aspect of the invention, it is possible to increase, for example, the practical utility of the steering system.

The first aspect of the invention is suitable for a so-called steer-by-wire steering system, that is, a system in which a steering device that steers wheels and an operation member are not mechanically connected to each other, and which steers the wheels in response to an operation of the operation member using power from a drive power source included in the steering device without using a force applied to the operation member. The first aspect of the invention is also suitable for a so-called VGRS (variable gear ratio steering) system, that is, a system in which a predetermined actuator is provided between an operation member and a steering device and which changes the ratio of the amount, by which wheels are steered, to the operation amount of the operation member by operating the actuator. With these systems, even when the operation range of the operation member is relatively small, the wheels are steered by a relatively large amount. Therefore, the operation range of the operation member is kept relatively small. Accordingly, it is considered that, even if the rim of the operation member is kept in the second shape in order to allow the driver to check the meters and to get on or off the vehicle more easily, the driver does not have great difficulty in rotating the operation member. However, in these systems, the wheels need to be steered by a force applied to the operation member, for example, when the drive power source of the steering device malfunctions. Therefore, the operation range of the operation member is kept relatively large. Accordingly, if the rim is in the second shape when the wheels need be steered by a relatively large amount, the operation for turning the operation member may be hindered. However, according to the first aspect of the invention, it is possible to increase the operation range of the operation member, for example, when a malfunction occurs in the system.

The term "annular shape" used in the description of the first aspect of the invention includes not only a perfect circle and an ellipse but also a form which may be regarded as a circle, e.g., a polygon form with round corners and arcuate sides. The "one portion of the steering rim" in the first aspect of the invention may be moved with respect to the other portion of the steering rim by a driver or by a device provided with a drive power source as described later in detail. According to the first aspect of the invention, the second shape may be a partially annular shape in which at least one portion does not contribute to formation of a continuous annular shape. That is, the second shape may be a partially annular shape in which multiple portions do not contribute to formation of a continuous annular shape.

(2) A second aspect of the invention relates to the vehicle steering system according to the first aspect of the invention, in which the second shape is an annular shape in which at least one portion is concave.

According to the second aspect of the invention, the second shape is limited. In the second aspect of the invention, when the rim is in the second shape, the one portion and the other portion of the rim may be connected to each other. As a result, the strength of the rim is enhanced. The "shape that is an annular shape in which at least one portion is concave" in the second aspect of the invention may be an annular shape in which at least one portion is arcuately concave, or an annular shape in which at least one portion has been substantially flattened.

(3) A third aspect of the invention relates to the vehicle steering system according to the second aspect of the invention, in which the rim shape changing mechanism allows the one portion of the steering rim to pivot about the axis that connects end portions of the one portion under the condition where the one portion is held at the end portions by the other portion of the steering rim.

According to the third aspect of the invention, the movement of the one portion of the rim with respect to the other portion of the rim caused by the rim shape changing mechanism is limited. In the third aspect of the invention, just causing the one portion of the rim to pivot about the axis that connects the end portions thereof with respect to the other portion of the rim makes it possible to change the shape of the rim between the first shape and the second shape. Therefore, according to the third aspect of the invention, for example, the structure for changing the shape of the rim between an annular shape and an annular shape in which at least one portion is concave may be simplified.

(4) A fourth aspect of the invention relates to the vehicle steering system according to any one of the first to third aspects of the invention, in which the one portion of the steering rim is one of an upper portion and a lower portion of the steering wheel in the neutral operation position.

According to the fourth aspect of the invention, the one portion of the rim is limited. The "neutral operation position" in the fourth aspect of the invention signifies the rotational position of the steering wheel, which corresponds to the steered position of the wheel when the vehicle is moving straight. When the steering wheel is in the neutral operation position, if the rim is in an annular shape, the upper portion of the rim may make it difficult for the driver to check the meters, and the lower portion of the rim may make it difficult for the driver to get on or off the vehicle. Therefore, according to the fourth aspect of the invention, the driver can check the meters and get on or off the vehicle more easily. In the fourth aspect of the invention, the rim is in an annular shape in which at least one of an upper portion and a lower portion is concave, when the steering wheel is in the neutral operation position. That is, the rim may be in an annular shape in which both the upper portion and the lower portion are concave, when the steering wheel is in the neutral operation position.

(5) A fifth aspect of the invention relates to the vehicle steering system according to any one of the first to fourth aspects of the invention, in which the steering wheel is provided with a fixing mechanism that fixes the one portion of the steering rim in a position in which the steering rim is in the first shape or in a position in which the steering rim is in the second shape.

When the rim is in the annular first shape, the driver sometimes grips the one portion of the rim and rotates the operation member. Therefore, if the one portion of the rim easily moves with respect to the other portion of the rim, the operation for rotating the operation member performed by the driver may be hindered. Even when the rim is in the second shape, the one portion of the rim should not move easily with respect to the other portion of the rim. Therefore, according to the fifth aspect of the invention, when the rim is in the first shape or the second shape, the one portion of the rim may be fixed so as to be immovable with respect to the other portion. The "fixing mechanism" in the fifth aspect of the invention fixes the one portion of the rim in the position in which the steering rim is in the first shape or the position in which the steering rim is in the second shape. Further, the fixing mechanism may fix the one portion of the rim in a position other than these positions.

(6) A sixth aspect of the invention relates to the vehicle steering system according to any one of the first to fifth aspects of the invention, in which the steering wheel is provided with a rim drive device that includes a drive power source and that operates the one portion of the steering rim using power from the drive power source.

According to the sixth aspect of the invention, it is possible to, for example, change the shape of the rim between the first shape and the second shape automatically. The concrete structure of the "drive power source" in the sixth aspect of the invention is not particularly limited. For example, a cylinder device that uses high-pressure gas, an electromagnetically-driven motor, an elastic body, for example, a solenoid valve or a spring, etc. may be used as the drive power source. The "rim drive device" in the sixth aspect of the invention may serve as the "fixing mechanism" in the fifth aspect of the invention. More specifically, the rim drive device may be structured to fix the one portion of the rim so as to be immovable with respect to the other portion of the rim when the drive power source does not operate properly.

(7) A seventh aspect of the invention relates to the vehicle steering system according to the sixth aspect of the invention, which further includes a control unit that controls the rim drive device.

According to the seventh aspect of the invention, the shape of the rim may be changed automatically depending on various situations. More specifically, when the driver gets on or off the vehicle, the rim is automatically brought into the second shape that is an annular shape in which the lower portion is concave, and the rim is automatically brought into the first shape when the vehicle is in motion. In addition, the shape of the rim may be automatically changed between the first shape and the second shape by operating the rim drive device in conjunction with another device included in the system, for example, an airbag device, a device that changes the operation range of the operation member, or the like. When the rim drive device is controlled in conjunction with another device included in the system, the "control unit" in the seventh aspect of the invention may also control the other device.

(8) An eighth aspect of the invention relates to the vehicle steering system according to the seventh aspect of the invention, which further includes an airbag device that deploys an airbag toward a driver, and in which the steering rim is kept in the second shape in the regular state; and the control unit includes an airbag deployment-time control unit that controls the rim drive device to change the shape of the steering rim from the second shape to the first shape when the airbag needs to be deployed.

When the rotational operation range in which the steering wheel can be rotated to steer the wheels is small, it is preferable to bring the rim into an annular shape in which at least one portion is concave in order to make it easier for the driver to check the meters and to get on or off the vehicle more easily as described above. Meanwhile, in the event of a vehicle collision, a secondary collision between the driver and, for example, the steering wheel may occur, and therefore many types of steering systems are provided with an airbag device to relax a shock given to the driver by the secondary collision. The airbag device deploys an airbag toward the driver in the event of a vehicle collision, and relaxes a shock given to the driver using the airbag. The airbag is held on its vehicle-front side, namely, on the side opposite to the side on which the driver is held, by the steering wheel. Therefore, when the rim of the steering wheel is in an annular shape, the airbag is able to exhibit its shock relaxing performance at a sufficient level. However, when the rim is in an annular shape in which at least one portion is concave, the airbag is not held at a sufficient level by the rim at the portion that corresponds to the concave portion of the annular shape. As a result, the airbag may fail to exhibit its shock relaxing performance at a sufficient level.

Therefore, in the eighth aspect of the invention, the rim is in the second shape in the regular state, and is in the annular first shape when the airbag needs to be deployed. According to the eighth aspect of the invention, the system, with which the driver is allowed to check the meters and to get on or off the vehicle more easily, is implemented in the regular state, and the shock relaxing performance of the airbag is exhibited at a sufficient level in the event of a vehicle collision.

(9) A ninth aspect of the invention relates to the vehicle steering system according to the seventh or eighth aspect of the invention, which further includes an operation range changing device that changes an operation range of the steering operation member, and in which the steering rim is kept in the second shape when the operation range of the steering operation member is kept small by the operation range changing device; and the control unit includes an operation range-based control unit that controls the rim drive device to change the shape of the steering rim from the second shape to the first shape when the operation range of the steering operation member is increased by the operation range changing device.

The ninth aspect of the invention is suitable for the above-described steer-by-wire system and the VGRS system. In these systems, because the operation range of the steering wheel is kept relatively small in the regular state, the rim may be in the second shape in order to make it easier for the driver to check the meters and to get on or off the vehicle. However, in these systems, for example, if the drive power source of the steering device malfunctions, the operation range of the steering wheel is made relatively large. Accordingly, if the rim is in the second shape when the wheels need to be steered by a relatively large amount, the operation for rotating the steering wheel may be hindered. However, according to the ninth aspect of the invention, the rim is brought into the annular first shape in response to a change in the operation range of the steering wheel, resulting in, for example, an increase in the practical utility of the system.

The concrete structure of the "operation range changing mechanism" in the ninth aspect of the invention is not particularly limited. For example, the operation range changing mechanism may have a structure in which multiple mechanical stoppers that define the operation range of the operation member (the mechanical stoppers may be members that limit the steering range, thereby defining the operation range of the operation member) are provided, and these stoppers are selectively operated. Alternatively, the operation range changing mechanism may have a structure in which a motor that is able to apply an operation reaction force to the operation member is provided instead of mechanical stoppers, and the operation range is defined by increasing the power of the motor.

(10) A tenth aspect of the invention relates to a vehicle steering system, including: a steering operation member that includes an auxiliary grip portion the position of which is changed between an expected grip position, in which the auxiliary grip portion is expected to be gripped by a driver during a steering operation, and a retracted position, which is reached when the auxiliary grip portion has been retracted from the expected grip position and in which the auxiliary grip portion is not expected to be gripped by the driver during the steering operation; an auxiliary-grip-portion position changing device that changes the position of the auxiliary grip portion between the expected grip position and the retracted position; an airbag device that deploys an airbag toward the driver from the steering operation member; and a control unit that controls an operation of the auxiliary-grip-portion position changing device, and that includes an airbag deployment-time control unit that changes the position of the auxiliary grip portion to the expected grip position if the auxiliary grip portion is in the retracted position when the airbag needs to be deployed.

According to the tenth aspect of the invention, the position of one portion of the steering operation member is changed when the airbag needs to be deployed. As according to the eighth aspect of the invention, according to the tenth aspect of the invention, when the auxiliary grip portion is in the retracted position, the system, with which the driver is allowed to check the meters and to get on or off the vehicle more easily, is implemented. On the other hand, when the airbag needs to be deployed, the auxiliary grip portion is able to hold the airbag at its vehicle-front side, in other words, at the side opposite to the side on which the driver is held. Therefore, the airbag device is able to exhibit its shock relaxing performance at a sufficient level. Therefore, from the viewpoint of the shock relaxing performance of the airbag device, the "expected grip position" in the tenth aspect of the invention is preferably a position in which the airbag can be held appropriately by the rim when the airbag is deployed.

The "retracted position" in the tenth aspect of the invention may be a position in which the driver cannot grip the auxiliary grip portion in the retracted position, or may be a position in which the driver can grip the auxiliary grip portion but the driver has difficulty in operating the operation member. The "expected grip position" in the tenth aspect of the invention may be a position in which the driver can grip the auxiliary grip portion and operate the operation member when the auxiliary grip portion is in the expected grip position.

(11) An eleventh aspect of the invention relates to the vehicle steering system according to the tenth aspect of the invention, which further includes an operation range changing device that changes the operation range of the steering operation member, and in which the auxiliary grip portion is kept in the retracted position when the operation range of the steering operation member is kept small by the operation range changing device; and the control unit includes an operation range-based control unit that changes the position of the auxiliary grip portion from the retracted position to the expected grip position when the operation range of the steering operation member is increased by the operation range changing device.

According to the eleventh aspect of the invention, the position of one portion of the steering operation member is changed based on the operation range of the steering operation member. As according to the ninth aspect of the invention, according to the eleventh aspect of the invention, when the operation range of the steering is kept relatively small, the system, with which the driver is allowed to check the meters and to get on or off the vehicle more easily, is implemented. On the other hand, when the operation range of the steering operation member is kept relatively large, the driver can grip the auxiliary grip portion and operate the operation member. As a result, the practical utility of the steering system including the operation range changing device is increased.

(12) A twelfth aspect of the invention relates to the vehicle steering system according to the tenth or eleventh aspect of the invention, in which the auxiliary grip portion is held at end portions by a portion of the steering operation member other than the auxiliary grip portion in such a manner that the auxiliary grip portion is allowed to pivot about the axis that connects the end portions to each other; the steering operation member is in an annular shape when the auxiliary grip portion is in the expected grip position; and the steering operation member is in a partially annular shape, when the auxiliary pip portion is in the retracted position.

According to the twelfth aspect of the invention, the movement of the auxiliary grip portion with respect to the portion other than the auxiliary grip portion and the shape of the steering operation member are limited. As according to the third aspect of the invention, according to the twelfth aspect of the invention, the structure for changing the shape of the operation member between an annular shape and a partially annular shape, is simplified.

(13) A thirteenth aspect of the invention relates to the vehicle steering system according to any one of the tenth to twelfth aspects of the invention, in which, when the auxiliary grip portion is in the expected grip position, the auxiliary grip portion constitutes at least one of an upper portion and a lower portion of the steering operation member in the neutral operation position.

According to the thirteenth aspect of the invention, the expected grip position is limited. As according to the fourth aspect of the invention, according to the thirteenth aspect of the invention, the driver is allowed to check the meters and to get on or off the vehicle more easily.

(14) A fourteenth aspect of the invention relates to the vehicle steering system according to the thirteenth aspect of the invention, in which the auxiliary grip portion of the steering operation member includes a first auxiliary grip portion and a second auxiliary grip portion; when the first auxiliary grip portion is in the expected grip position, the first auxiliary grip portion constitutes the upper portion of the steering operation member in the neutral operation position; and when the second auxiliary grip portion is in the expected grip position, the second auxiliary grip portion constitutes the lower portion of the steering operation member in the neutral operation position.

According to the fourteenth aspect of the invention, the driver is allowed both to check the meters and to get on or off the vehicle more easily.

BRIEF DESCRIPTION OF THE DRAWINGS

The above and other objects and features of the invention will become apparent from the following description of an embodiment, given in conjunction with the accompanying drawings, in which:

FIG. 3 is a view showing a steering wheel of the operation device viewed from the left side of a vehicle;

FIG. 4 is a cross-sectional view showing the steering wheel of the operation device viewed from the left side of the vehicle;

FIG. 16 is a view showing the steering wheel in the second shape when viewed from the rear of the vehicle, in the case where the second shape is the shape of the steering rim that is achieved when the upper arc portion and the lower arc portion are fixed at the positions that are reached when they pivot 90° from the positions thereof when the steering rim is in the first shape.

DETAILED DESCRIPTION OF EMBODIMENT

Hereafter, an embodiment of the invention and modified examples of the embodiment of the invention will be described in detail with reference to the accompanying drawings. Note that, the invention may be implemented not only in the embodiment described below but also various other embodiments that are derived through various modifications and arrangements which are made based on the knowledge of those skilled in the art such as the aspects of the invention described in the summary of the invention.

Entire Structure of Steering System

Figure 1:
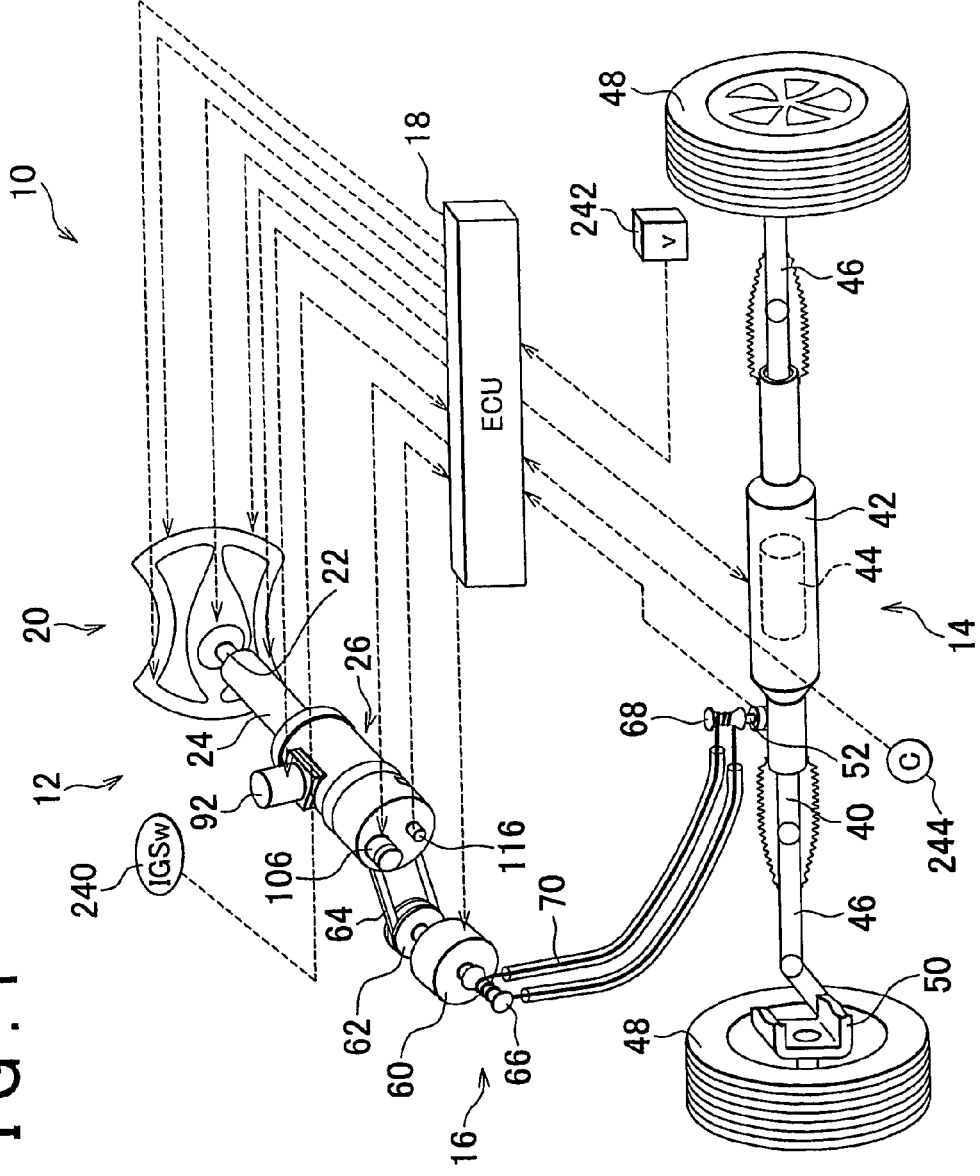
FIG. 1 is a view showing the entire structure of a steering system according to an embodiment of the invention.

A steering system 10 according to an embodiment of the invention is a steer-by-wire steering system, as shown in FIG. 1. The steering system 10 mainly includes: a steering operation device (hereinafter, referred to as "operation device" where appropriate) 12; a steering device 14 that steers wheels; a coupling device 16 that couples the steering operation device 12 with the steering device 14; and an electronic control unit (hereinafter, referred to as "ECU" where appropriate) 18 that serves as a control unit for the steering system 10.

The operation device 12 includes: a steering wheel 20 that serves as a steering operation member operated by a driver; a steering shaft (hereinafter, referred to as "shaft") 22, one end of which is attached to the steering wheel 20; a tube 24 that serves as a holding member which rotatably holds the shaft 22 that passes through the tube 24; and an operation reaction force applying device 26 that is fixed to a vehicle-front-side end portion of the tube 24, and that applies a reaction force against the operation of the steering wheel 20 to the steering wheel 20 via the shaft 22. The operation device 12 is fixed, at the operation reaction force applying device 26, to a part of a vehicle body, more specifically, to a reinforcement 234 (see FIG. 10) that serves as a reinforcing member for an instrument panel. The operation device 12 further includes an airbag device 30 (sec FIG. 4).

The steering device 14 includes: a steering rod 40; a housing 42 that holds the steering rod 40 in such a manner that the steering rod 40 is movable in its axial direction; a steering motor 44 which is provided within the housing 42 and which serves as a drive power source that is used to move the steering rod 40 in its axial direction; and paired link rods 46 that are connected to respective ends of the steering rod 40 via flexible joints. Each of the link rods 46 is connected, at its tip end, to an arm of a steering knuckle 50 that holds a corresponding wheel 48 via another flexible joint in such a manner that the wheel 48 is allowed to be steered. An external thread is formed on the steering rod 40 and a nut that is screwed with the external thread is provided in the housing 42. The steering motor 44 rotates the nut to move the steering rod 40 in its axial direction, thereby steering the wheels 48. Furthermore, a rack is formed on the steering rod 40, and a pinion shaft 52, provided with a pinion that meshes with the rack, is rotatably held in the housing 42 while one end of the pinion shaft 52 protrudes from the housing 42. As will be described later in more detail, the operation device 12 is able to steer the wheels 48 also by rotating the pinion shaft 52.

The coupling device 16 mainly includes an electromagnetically-driven clutch 60. An input pulley 62 is attached to an input portion of the electromagnetically-driven clutch 60. The input pulley 62 and an output pulley 104 (see FIG. 2), which is attached to the shaft 22, are connected to each other via a belt 64 so that the rotation of the input pulley 104 is transferred to the output pulley 104. An output roller 66 is attached to an output portion of the electromagnetically-driven clutch 60. The output roller 66 and an input roller 68, which is formed integrally with the pinion shaft 52 of the steering device 14, are connected to each other via a wire 70 so that the rotation of the input roller 68 is transferred to the output roller 66. When being supplied with electric power, the electromagnetically-driven clutch 60 permits relative rotation between the input pulley 62 and the output roller 66, thereby establishing the state in which no operation force is transferred between the operation device 12 and the steering device 14. When not being supplied with electric power, the electromagnetically-driven clutch 60 prohibits relative rotation between the input pulley 62 and the output roller 66, thereby establishing the state in which an operation force from the steering wheel 20 is transferred to the steering device 14.

Structure of Operation Reaction Force Applying Device

Figure 2:
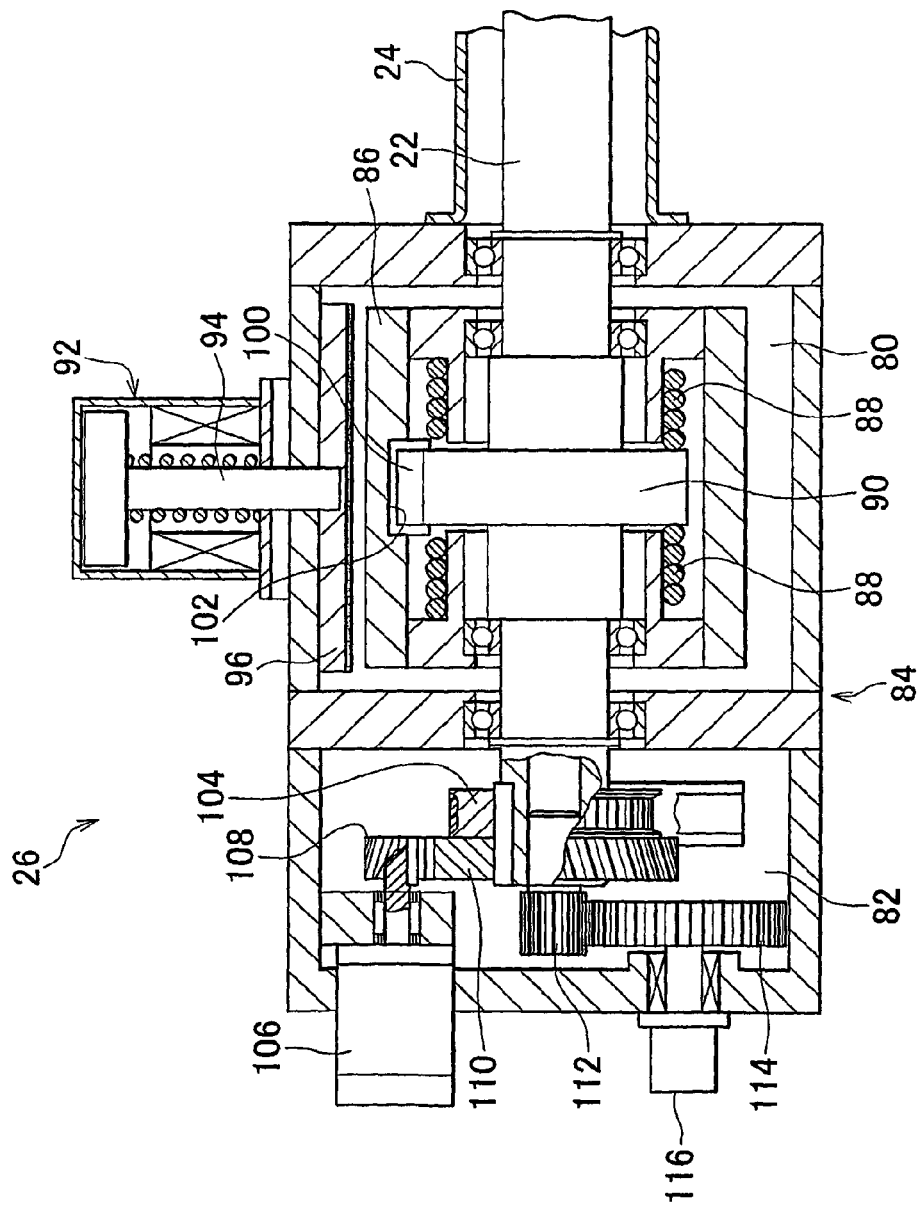
FIG. 2 is a cross-sectional view showing an operation reaction force applying device included in an operation device of the steering system.
Figure 5:
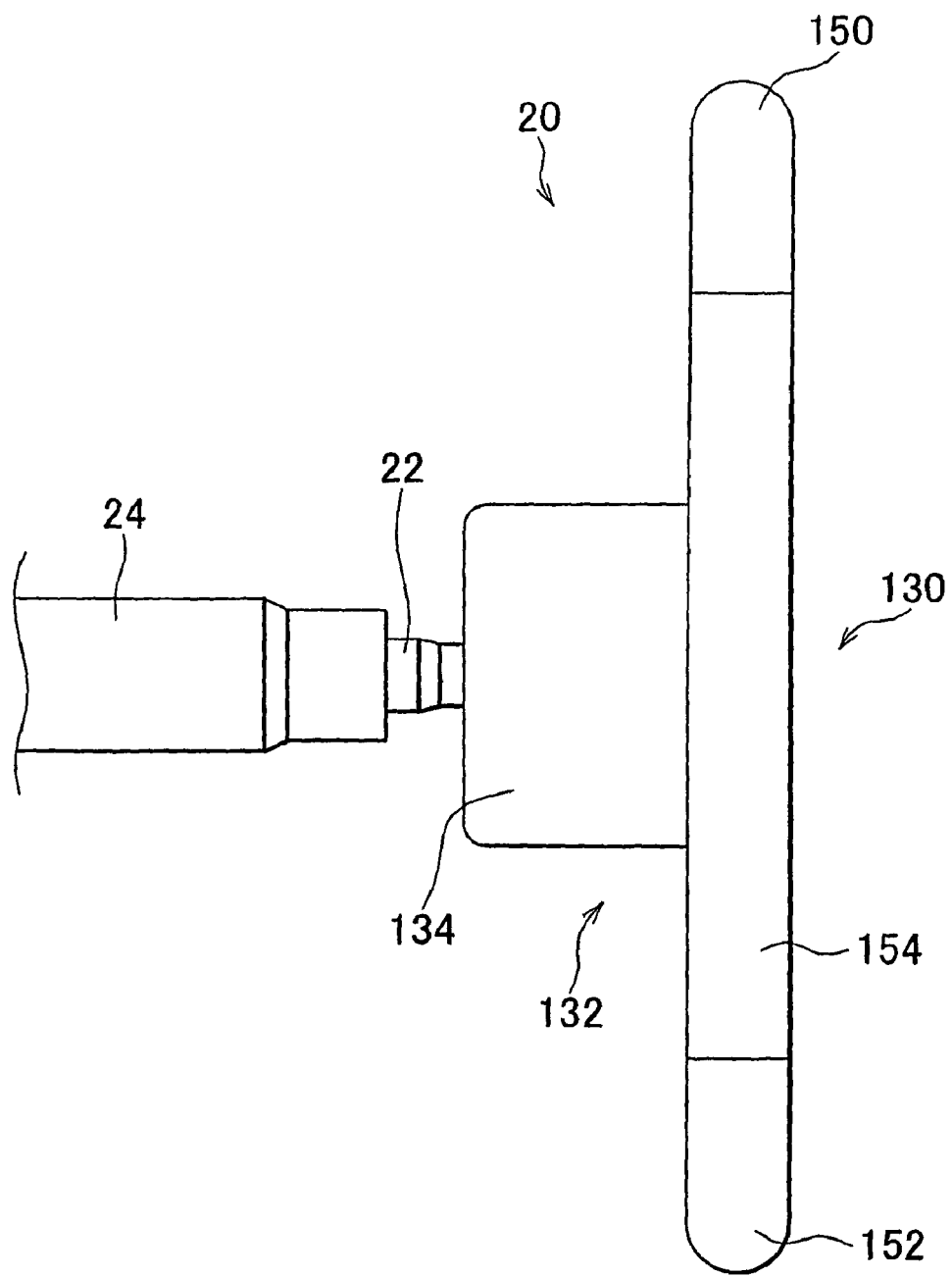
FIG. 5 is a view showing the steering wheel of the operation device viewed from above.

As shown in FIG. 2, the operation reaction force applying device 26 includes a cylindrical housing 84 that has a rear chamber 80 formed at a position closer to the rear of the vehicle (on the right side in FIG. 2) and a front chamber 82 formed at a position closer to the front of the vehicle (on the left side in FIG. 2). The shaft 22 passes through the rear chamber 80, and is rotatably held in the housing 84. Although not shown in FIG. 2, the shaft 22 is connected, at a right-hand-side end portion, to the steering wheel 20. Within the rear chamber 80, the shaft 22 passes through a cylindrical spring case 86, and rotatably supports the cylindrical spring case 86. Paired torsion coil springs (hereinafter, referred to as "springs" where appropriate) 88 are provided around the shaft 22. These springs 88 are wound in the opposite directions. In addition, one end of each spring 88 is fixed to the inner face of the spring case 86, and the other end of each spring 88 is fixed to a large diameter portion 90 of the shaft 22. In the state shown in FIG. 2, the springs 88 are both twisted and the torsional reaction forces thereof are kept balanced. In this state, the steering wheel 20 is in the neutral position that corresponds to the neutral steering position of the wheels, i.e., at the neutral operation position.

A solenoid valve 92 is provided on the outer peripheral portion of the housing 84. The solenoid valve 92 has a rod 94 that extends into the rear chamber 80. An engagement plate 96 is attached to a tip end portion of the rod 94. When the solenoid valve 92 is not supplied with electric power, the engagement plate 96 is apart from the outer peripheral face of the spring case 86. Therefore, when the shaft 22 rotates, the spring case 86 rotates together with the shaft 22. Namely, the rotation of the spring case 86 is permitted. On the other hand, when the solenoid valve 92 is supplied with electric power, the engagement plate 96 moves forward, namely, contacts the outer peripheral face of the spring case 86 due to the movement of the rod 94. A surface treatment, which makes it possible to generate a large friction force, is provided to the engagement plate 96. The rotation of the spring case 86 is prohibited by the friction force. If the shaft 22 is rotated in response to an operation of the steering wheel 20 under the condition where the rotation of the spring case 86 is prohibited, the balance in the torsional reaction force between the springs 88 is lost and, consequently, a reaction force against the operation of the steering wheel 20 is transferred to the driver via the steering wheel 20. That is, the operation reaction force applying device 26 includes an elastic force-based operation reaction force generating mechanism that generates a reaction force against the operation of the steering wheel 20 using an elastic force of an elastic member.

The large diameter portion 90 of the shaft 22A has a projecting portion 100 that protrudes from the outer peripheral face of the large diameter portion 90. In addition, a groove 102, through which the projecting portion 100 passes, is formed in the inner peripheral face of the spring case 86, and extends in the circumferential direction of the spring case 86. Under the condition where the rotation of the spring case 86 is prohibited, the projecting portion 100 is allowed to move within the groove 102 as the steering wheel 20 is rotated. If the operation amount (the amount by which the steering wheel 20 is rotated from the neutral operation position) of the steering wheel 20 is increased to a certain degree, the projecting portion 100 comes into contact with an end portion of the groove 102, whereby the rotation range within which the steering wheel 20 is rotated is limited. Namely, the operation reaction force applying device 26 has an operation range limiting mechanism. Under the condition where the rotation of the spring case 86 is permitted, the projecting portion 100 does not contact the end portion of the groove 102, and, therefore, the operation range is not limited by the operation range limiting mechanism. With this structure, the operation reaction force applying device 26 functions as an operation range changing device that includes the operation range limiting mechanism and a mechanism that changes the rotational state of the spring case 86 between the state in which the rotation of the spring case 86 is prohibited and the state in which the rotation of the spring case 86 is permitted.

In the front chamber 82, the output pulley 104 is fitted to the shaft 22 in such a manner that the output pulley 104 and the shaft 22 cannot rotate with respect to each other. A reaction force motor 106 is attached to the housing 84. The reaction force motor 106 applies a rotational force to the shaft 22 via gears 108 and 110. Namely, the operation reaction force applying device 26 has a motor power-based operation reaction force generating mechanism that generates a reaction force against an operation of the steering wheel 20 using the power from the reaction force motor 106. The rotation amount (rotational angle) of the shaft 22 is detected by a rotational angle sensor 116 via gears 112 and 114. The rotational angle sensor 116 serves as an operation amount sensor that detects the operation amount of the steering wheel 20.

Structure of Steering Wheel and Airbag Device

As shown in FIGS. 3 to 6, the steering wheel 20 includes a steering rim 130 (hereinafter, referred to as "rim" where appropriate) which the driver grips, and a case 132 that fixes the rim 130 to the shaft 22. The case 132 includes a hub portion 134 that is fixed to one end of the shaft 22, and paired spokes 136 that are connected to the rim 130. More specifically, the hub portion 134 is provided at substantially the center of the steering wheel 20. The spokes 136 extend in the opposite directions from the hub portion 134, and are connected to the rim 130. A hole 137 is formed in the vehicle-front-side portion of the hub portion 134. The shaft 22 is fitted into the hole 137 in a serration manner, and the case 132 is fitted to the shaft 22 using the external thread formed at the tip end portion of the shaft 22 and the nut 138 screwed with the external thread. Each of FIGS. 3 to 6 shows the state in which the steering wheel 20 is in the neutral operation position. In this state, one of the spokes 136 extends from the hub portion 134 rightward, and the other spoke 136 extends from the hub portion 134 leftward. The rightmost end portion of the spokes 136, which extend rightward, and the leftmost end portion, which extends leftward, are integrated with the rim 130. The rim 130 and the case 132 are formed integrally with each other.

As shown in FIG. 4, the airbag device 30 is embedded within the hub portion 134 of the case 132. The airbag device 30 includes an airbag 140 which is folded and housed within the hub portion 134, and an inflator 142 that deploys the airbag 140.

Figure 6:
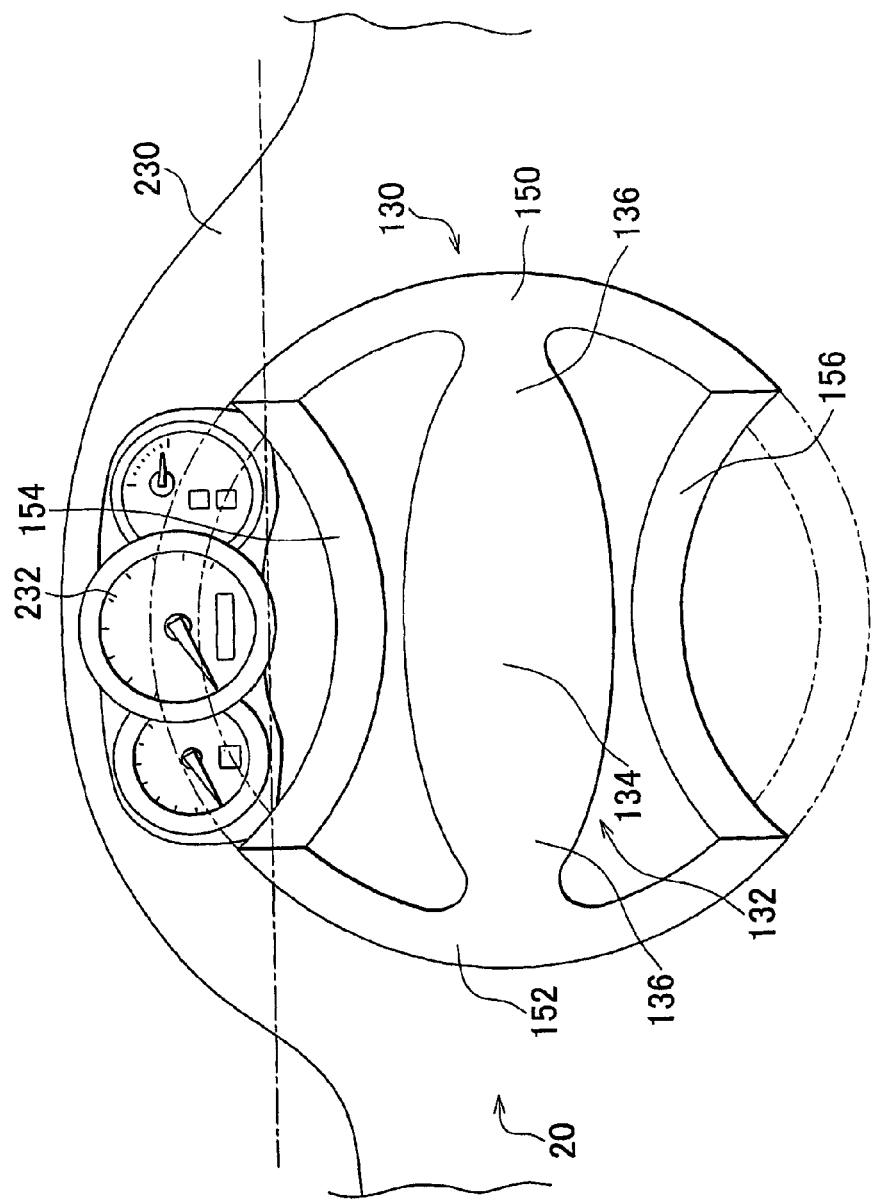
FIG. 6 is a view showing the steering wheel of the operation device viewed from the rear of the vehicle.

As shown in FIG. 6, the rim 130 includes a right arc portion 150, a left arc portion 152, an upper arc portion 154, and a lower arc portion 156. The right arc portion 150 having an arc shape is connected to and supported by the spoke 136, from among the paired spoke portions 136, which is on the right side when the steering wheel 20 is viewed from the rear of the vehicle, under the condition where the steering wheel 20 is in the neutral operation position. The left arc portion 152 having an arc shape is connected to and supported by the other spoke 136. The upper arc portion 154 having an arc shape is connected to the upper ends of the right and left arc portions 150 and 152 under the condition where the steering wheel 20 is in the neutral operation position. The lower arc portion 156 having an arc shape is connected to the lower ends of the right and left arc portions 150 and 152 under the condition where the steering wheel 20 is in the neutral operation position. Unless otherwise specified, the directions mentioned in the following description of the rim 130 signify the directions when the steering wheel 20 is in the neutral operation position.

Figure 7:
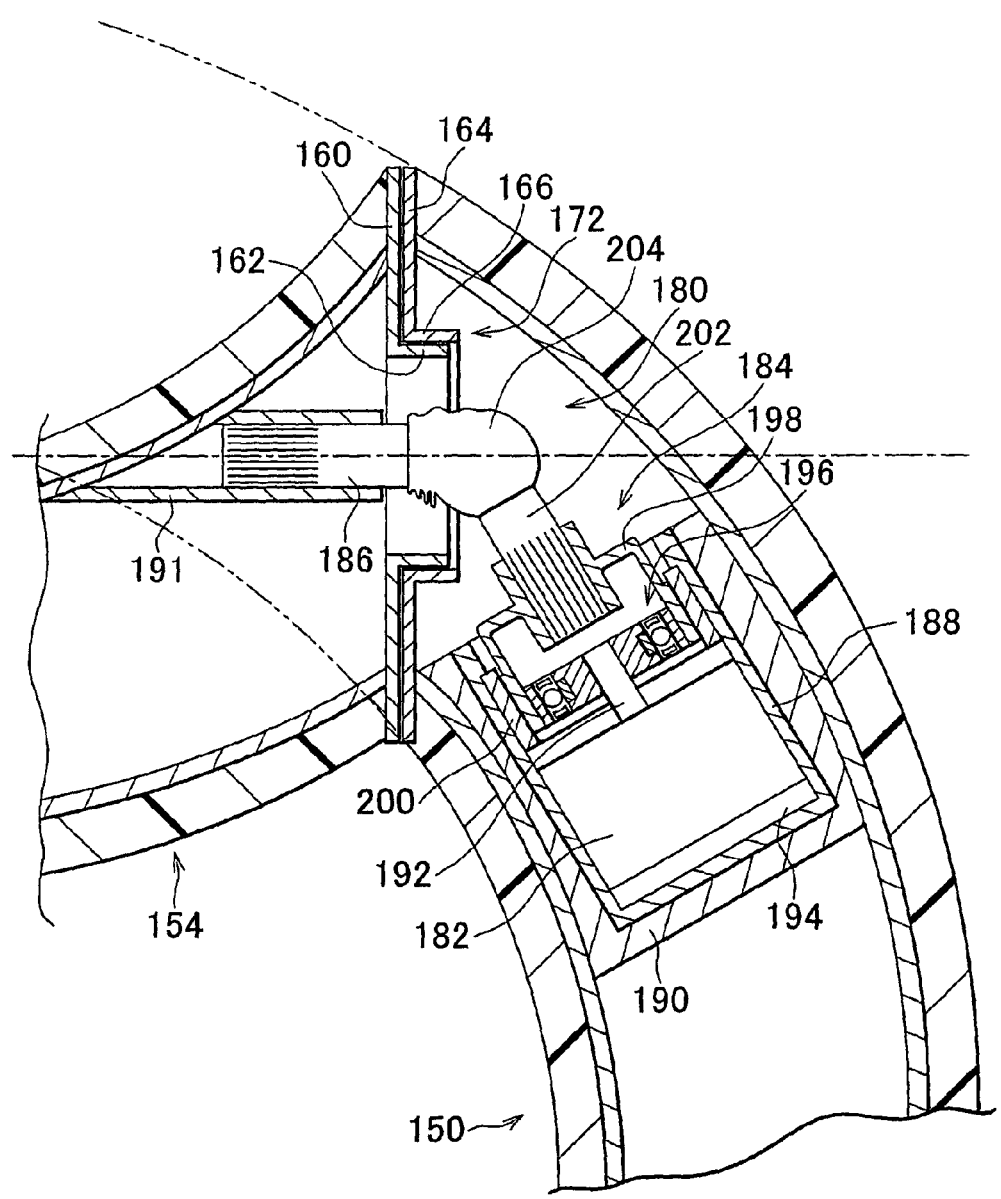
FIG. 7 is an enlarged cross-sectional view showing a connection portion at which an upper arc portion and a right arc portion are connected to each other.
Figure 8:
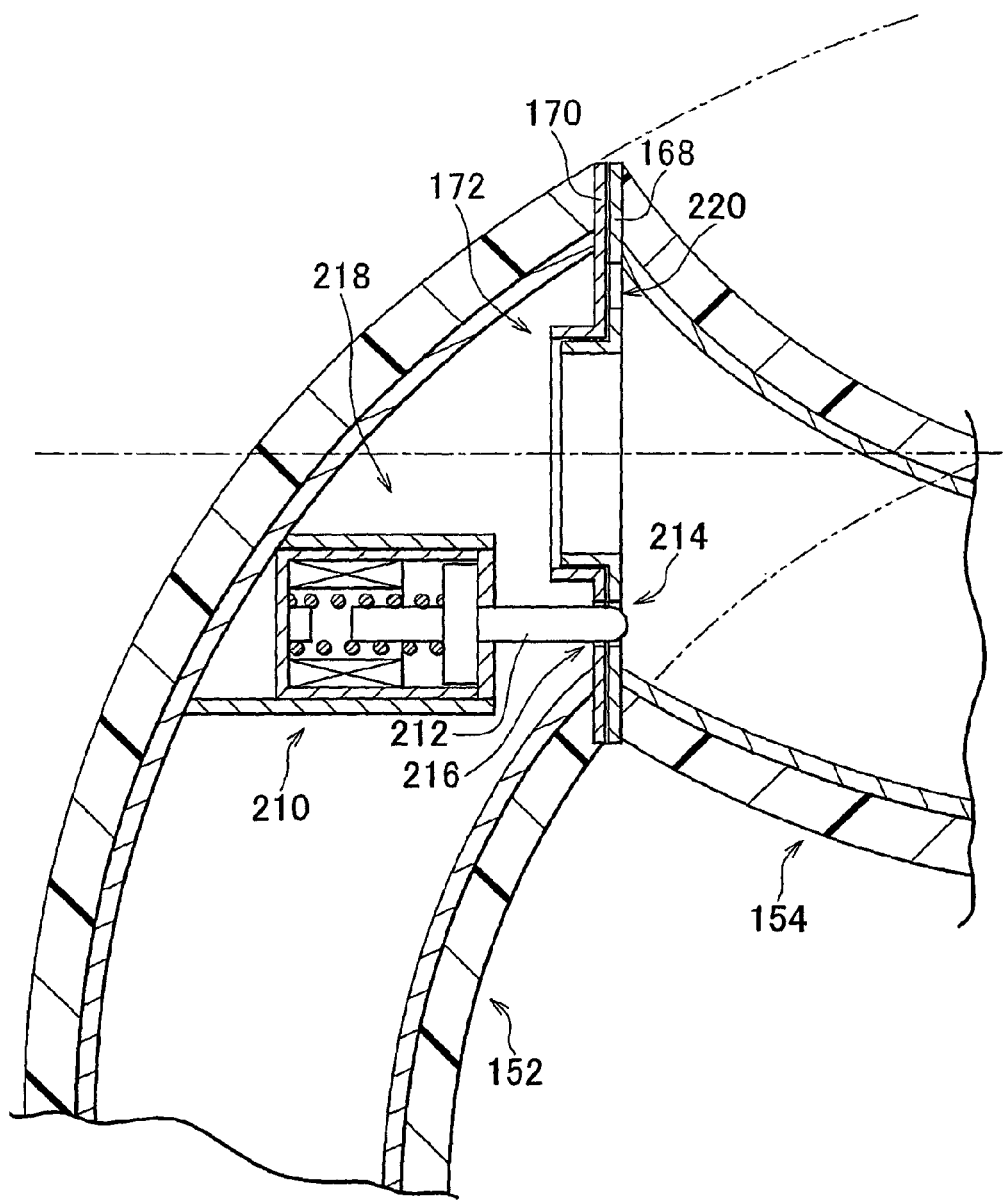
FIG. 8 is an enlarged cross-sectional view showing a connection portion at which the upper arc portion and a left arc portion are connected to each other.

The upper arc portion 154 is connected at its ends to the right and left arc portions 150 and 152 in such a manner that upper arc portion 154 is allowed to pivot about the axis (indicated by a chain line) that connects the ends of the upper arc portion 154 to each other. FIG. 7 is an enlarged cross-sectional view showing a connection portion at which the right end of the upper arc portion 154 and the upper end of the right arc portion 150 are connected to each other. FIG. 8 is an enlarged cross-sectional view showing a connection portion at which the left end of the upper arc portion 154 and the upper end of the left arc portion 152 are connected to each other. As shown in FIG. 7, an end face cover member 160 is fixed to the right end face of the upper arc portion 154, and a cylindrical shaft portion 162 is formed at the center portion of the end face cover member 160. An end face cover member 164 is fixed to the upper end face of the right arc portion 150, and a bearing portion 166 is formed at the center portion of the end face cover member 164. The outer diameter of the shaft portion 162 of the end face cover member 160 is slightly smaller than the inner diameter of the bearing portion 166 of the end face cover member 164. The shaft portion 162 of the end face cover member 160 is fitted into the bearing portion 166 of the end face cover member 164. As shown in FIG. 8, an end face cover member 168, which has substantially the same structure as that of the end face cover member 160, is fixed to the left end face of the upper arc portion 154, and an end face cover member 170, which has substantially the same structure as that of the end face cover member 164, is fixed to the upper end face of the left arc portion 152. The end face cover member 168 and the end face cover member 170 are fitted to each other.

With this structure, the upper arc portion 154 is connected to the right and left arc portions 150 and 152 in such a manner that the upper arc portion is allowed to pivot about the axis that connects the ends of the upper arc portion 154 using the end face cover members 160, 164, 168 and 170. More specifically, the end face cover members 160, 164, 168 and 170 allow the upper arc portion 154, which is a part of the rim 130, to pivot with respect to the right and left arc portions 150 and 152 that form the other portion of the rim 130. The steering wheel 20 includes a pivot-motion permitting mechanism 172 formed of the end face cover members 160, 164, 168 and 170.

In addition, the steering wheel 20 includes a rim drive device 180 that allows the upper arc portion 154 to pivot about the above-mentioned axis with respect to the right and left arc portions 150 and 152. As shown in FIG. 7, the rim drive device 180 includes an electromagnetically-driven motor 182 that serves as a drive power source, a reducer 184 that reduces the speed of rotation transferred from the electromagnetically-driven motor 182 and then transfers the rotation having a reduced speed, and a rim pivot shaft 186 that is connected to the reducer 184 and that causes the upper arc portion 154 to pivot. The electromagnetically-driven motor 182 and the reducer 184 are provided within a cylindrical housing 188 which has a bottom portion. The housing 188 is fixed within the right arc portion 150 via a holder 190. The rim pivot shaft 186 is fixed into a holding sleeve 191 that extends along the direction of the above-mentioned axis and that is provided within the upper arc portion 154.

The electromagnetically-driven motor 182 is fixed to the inner face of the housing 188. A motor rotational angle sensor 194 is provided in the housing 188. The motor rotational angle sensor 194 detects the rotational angle of a motor shaft 192 of the electromagnetically-driven motor 182, i.e., the rotational angle of the electromagnetically-driven motor 182. The motor rotational angle sensor 194 mainly includes an encoder, and is used to control the rim drive device 180.

The reducer 184, which serves as a harmonic gear mechanism (sometimes called a harmonic drive (registered trademark) mechanism, a strain wave gear ring mechanism, etc.), includes a wave generator 196, a flexible gear (flexspline) 198 and a ring gear (circular spline) 200. The wave generator 196 has an elliptical cam and a ball bearing fitted to the outer periphery of the elliptical cam, and is fixed to the motor shaft 192. The flexible gear 198 is formed into a cup shape and has an elastically deformable peripheral wall portion. A plurality of teeth is formed on an opening-side outer periphery of the peripheral wall portion. The flexible gear 198 is splined, at its bottom portion, to an output shaft 202 in such a manner that the flexible gear 198 and the output shaft 202 cannot rotate with respect to each other. The output shaft 202 is connected to the rim pivot shaft 186, which is fixed to the upper arc portion 154, via a flexible joint 204 covered with a cover. The ring gear 200 is ring-shaped and has a plurality of teeth (the number of teeth of the ring gear 200 is slightly larger than that of the flexible gear by, for example, two) formed on its inner periphery. The ring gear 200 is fixed to the housing 188. The flexible gear 198 is elastically deformed into an elliptical shape when the peripheral wall portion of the flexible gear 198 is fitted over the wave generator 196. As a result, the flexible gear 198 is meshed with the ring gear 200 at two portions that are positioned along the major axis of the ellipse but is not meshed with the ring gear 200 at the other portions. With this structure, when the wave generator 196 makes one rotation (of 360°), namely, when the motor shaft 192 of the electromagnetically-driven motor 182 makes one rotation, a relative rotation between the flexible gear 198 and the ring gear 200 is caused. The amount of the relative rotation corresponds to the difference in the number of teeth between the flexible gear 198 and the ring gear 200. In accordance with this relative rotation, the upper arc portion 154 pivots about the axis with respect to the right and left arc portions 150 and 152.

As shown in FIG. 8, a solenoid valve 210 is provided within the left arc portion 152, and holes 214 and 216, through which the tip end portion of a rod 212 of the solenoid valve 210 passes, are formed in the end face cover members 168 and 170, respectively, which form the pivot-motion permitting mechanism 172. As shown in FIG. 8, when the solenoid valve 210 is not supplied with electric power, the tip end portion of the rod 212 of the solenoid valve 210 passes through the holes 214 and 216 formed in the end face cover members 168 and 170, respectively, whereby the upper arc portion 154 is fixed with respect to the right and left arc portions 150 and 152. On the other hand, when the solenoid valve 210 is supplied with electric power, the tip end portion of the rod 212 of the solenoid valve 210 is not within the holes 214 and 216 formed in the end face cover members 168 and 170, respectively, whereby the upper arc portion 154 is allowed to pivot with respect to the right and left arc portions 150 and 152. That is, the steering wheel 20 has a fixing member 218 formed of the solenoid valve 210, the holes 214 and 216, etc.

In addition to the hole 214, a hole 220 is also formed in the end face cover member 168 at a position at which the hole 214 will be present if the end face cover member 180 having the hole 214 is rotated 180° about the axis. More specifically, the upper arc portion 154 may be fixed with respect to the right and left arc portions 150 and 152 at a position that is reached when the upper arc portion 154 pivots 180° about the axis from the position, shown in the figures, at which the upper arc portion 154 is fixed with respect to the right and left arc portions 150 and 152. The right arc portion 150 and the left arc portion 152 are arranged along an annular shape that lies on a plane perpendicular to the shaft 22. The shaft 22 is at the center of this annular shape. The right arc portion 150 and the left arc portion 152 are arranged at diametrically opposite positions with respect to the shaft 22 along the annular shape. In the steering system 10, the hole 220 of the end face cover member 168 is formed at such a position that, when the upper arc portion 154 is arranged along the annular shape, the tip end portion of the rod 212 of the solenoid valve 210 passes through the hole 220. Therefore, if the solenoid valve 210 is not supplied with electric power and the tip end portion of the rod 212 of the solenoid valve 210 passes through the holes 220 and 216 formed in the end face cover members 168 and 170, respectively, the upper arc portion 154, the right arc portion 150 and the left arc portion 152 are all arranged along the same annular shape.

As in the structure in which the upper arc portion 154 is connected to the right and left arc portions 150 and 152, the lower arc portion 156 is connected at its ends to the lower ends of the right and left arc portions 150 and 152 in such a manner that the lower arc portion 156 is allowed to pivot about the axis that connects the ends of the lower arc portion 156. More specifically, the lower arc portion 156, which is a part of the rim 130, may be allowed to pivot or fixed with respect to the right and left arc portions 150 and 152 that form the other portion of the rim 130. It is possible to cause the lower arc portion 156 to pivot with respect to the other portion of the rim 130 using the electromagnetically-driven motor. Therefore, the same structures as those of the pivot-motion permitting mechanism 172 and the rim drive mechanism 180 are provided in the connection portion at which the lower arc portion 156 is connected to one of the right and left arc portions 150 and 152, and the same structure as that of the fixing mechanism 218 is provided in the connection portion at which the lower arc portion 156 is connected to the other of the right and left arc portions 150 and 152. This makes it possible to fix the lower arc portion 156 with respect to the right and left arc portions 150 and 152 in the state in which the lower arc portion 156, the right arc portion 150 and the left arc portion 152 are all arranged along the same annular shape. Furthermore, it is possible to fix the lower arc portion 156 with respect to the right and left arc portions 150 and 152 in a position that is reached when the lower arc portion 156 pivots 180° about the axis from the position when the lower arc portion 156, the right arc portion 150 and the left arc portion 152 are all arranged along the same annular shape.

The structures mentioned above make it possible to arrange the upper arc portion 154, the lower arc portion 156, the right arc portion 150 and the left arc portion 152 along the same annular shape. It is also possible to arrange the upper arc portion 154 in a position that is reached when the upper arc portion 154 pivots 180° about the upper axis with respect to the other portion of the rim 130 from the position when all the arc portions are arranged along the same annular shape, and to arrange the lower arc portion 156 in a position that is reached when the lower arc portion 156 pivots 180° about the lower axis with respect to the other portion of the rim 130 from the position when all the arc portions are arranged along the same annular shape. More specifically, in the steering system 10, the rim 130 of the steering wheel 20 may be in an annular first shape (indicated by chain double-dashed lines) or a partially annular second shape (indicated by solid lines). Because the pivot-motion permitting mechanism 172 changes the shape of the rim 130, the pivot-motion permitting mechanism 172 serves as a rim shape changing mechanism.

Relationship Between Rim Shape and Operation of Steering Wheel

As described above, a so-called steer-by-wire steering system is employed as the steering system 10. Therefore, the wheels 48 are steered by the drive power from the steering motor 44 of the steering device 14 without the use of the operating force applied to the steering wheel 20 by the driver. Thus, no operating force of the driver is required to steer the wheels 48. In view of operability, the wheels 48 are steered by a large amount even if the operation amount of the steering wheel 20 is relatively small. Therefore, the operation range of the steering wheel 20 is limited to a relatively small range by the operation range limiting mechanism provided in the operation reaction force applying device 26. More specifically, the clockwise and counterclockwise steering operations are performed within the limited ranges from the neutral operation position to the respective positions that are reached when the steering wheel 20 is rotated 45° clockwise and counterclockwise, respectively. Accordingly, it is not often the case that the driver grips the upper and lower arc portions 154 and 156 of the rim 130 to rotate the steering wheel 20.

As shown in FIG. 6, when the rim 130 has an annular shape, the upper arc portion 154 obstructs the driver's view of a speedometer 232, etc. provided in an upper portion of an instrument panel 230. In addition, when the driver gets into or out of the vehicle, the lower arc portion 156 contacts, for example, the legs of the driver, which may sometimes make it difficult for the driver to get into or out of the vehicle. As in the steering system 10, when a so-called steer-by-wire steering system is employed, it is preferable to bring the rim 130 into the second shape to avoid the above-described inconveniences.

Figure 9A:
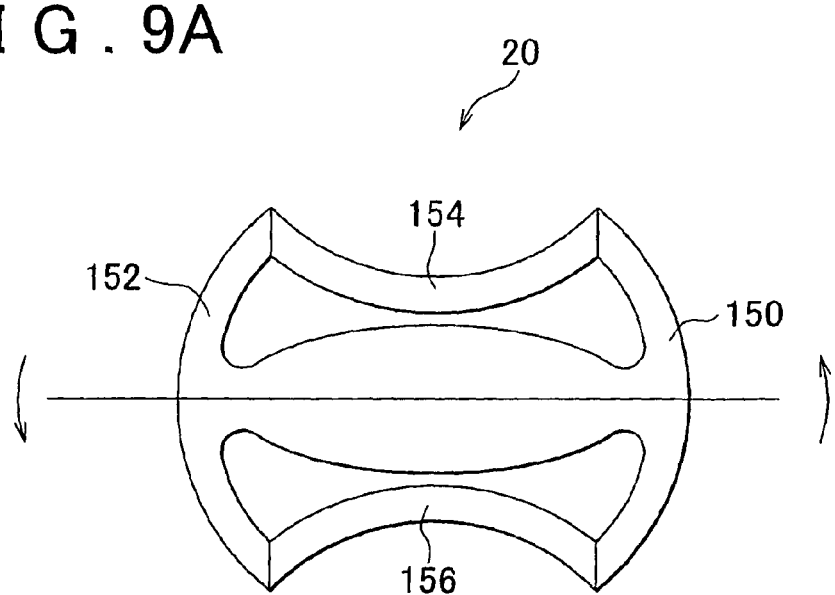
FIG. 9A is a view showing the steering wheel in the neutral operation position.
Figure 9B:
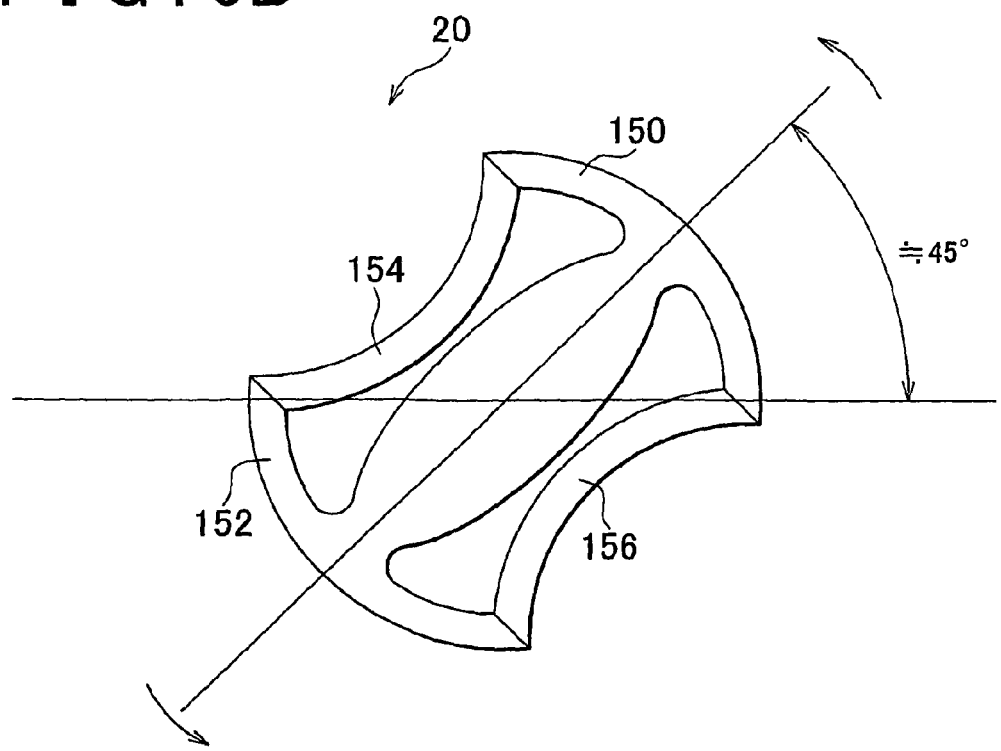
FIG. 9B is a view showing the steering wheel in a position that is reached when the steering wheel is rotated counter-clockwise 45° from the neutral operation position.

FIG. 9A shows the steering wheel 20 in the neutral operation position in the state where the rim 130 is in the second shape. FIG. 9B shows the steering wheel 20 in a position that is reached when it is rotated counterclockwise 45° from the neutral position in response to a counterclockwise operation in the state where the rim 130 is in the second shape. As can be seen from FIGS. 9A and 9B, it is possible for the driver to rotate the steering wheel 20 within the range from the position 45° clockwise apart from the neutral operation position to the position 45° counterclockwise apart from the neutral operation position. Accordingly, in the steering system 10, the rim 130 is usually kept in the second shape.

If, for example, the steering motor 44 malfunctions, the wheels 48 are steered by the operating force of the driver. Therefore, the ratio of the amount, by which the wheels 48 are steered, to the operation amount of the steering wheel 20 is made small in order to reduce the burden on the driver in operating the steering wheel 20. In this case, the limitation on the operation range imposed by the operation range limiting mechanism is cancelled and the operation range is therefore increased. The operation range is increased to the operation range in which the steering amount is limited by the steering device 14. More specifically, the operation range is increased to the operation range in which the steering wheel 20 can be rotated from the neutral operation position to the position approximately 540° clockwise apart from the neutral operation position and can be rotated from the neutral operation position to the position approximately 540° counterclockwise apart from the neutral operation position. That is, it becomes possible for the driver to make one and a half rotation of the steering wheel 20 clockwise and counterclockwise. If the operation range of the steering wheel 20 is increased in this manner, the driver needs to shift the gripped portion of the rim 130. Therefore, if the rim 130 is in the second shape, the ease in operating the steering wheel 20 may possibly be reduced.

In view of the above circumstances, in the steering system 10, the rim 130 is kept in the second shape when, for example, the steering motor 44 is functioning properly and the operation range of the steering wheel 20 is kept small. However, the rim 130 is brought into the annular first shape when, for example, the steering motor 44 malfunctions and the operation range of the steering wheel 20 needs to be increased. More specifically, when the operation range of the steering wheel 20 is increased, the upper and lower arc portions 154 and 156 are brought into the expected grip positions (indicated by chain double-dashed lines in FIG. 6) in which the driver will grip the upper and lower arc portions 154 and 156. When the operation range of the steering wheel 20 is reduced, the upper and lower arc portions 154 and 156 are retracted from the expected grip positions to the retracted positions (indicated by solid lines in FIG. 6) in which the driver will not grip the upper and lower arc portions 154 and 156. Therefore, the upper and lower arc portions 154 and 156 may be regarded as auxiliary grip portions that may be gripped by the driver when needed, whereas the right and left arc portions 150 and 152, which form portions of the steering wheel 20 other than the auxiliary grip portions, serve as the primary grip portions. Because the positions of the upper arc portion 154, which serves as the first auxiliary grip portion, and the lower arc portion 156, which serves as the second auxiliary grip portion, are changed between the expected grip positions and the retracted positions by means of the rim drive device 180. Therefore, the rim drive device 180 serves as an auxiliary-grip-portion position changing device.

Relationship Between Rim Shape and Airbag Device

Figure 10:
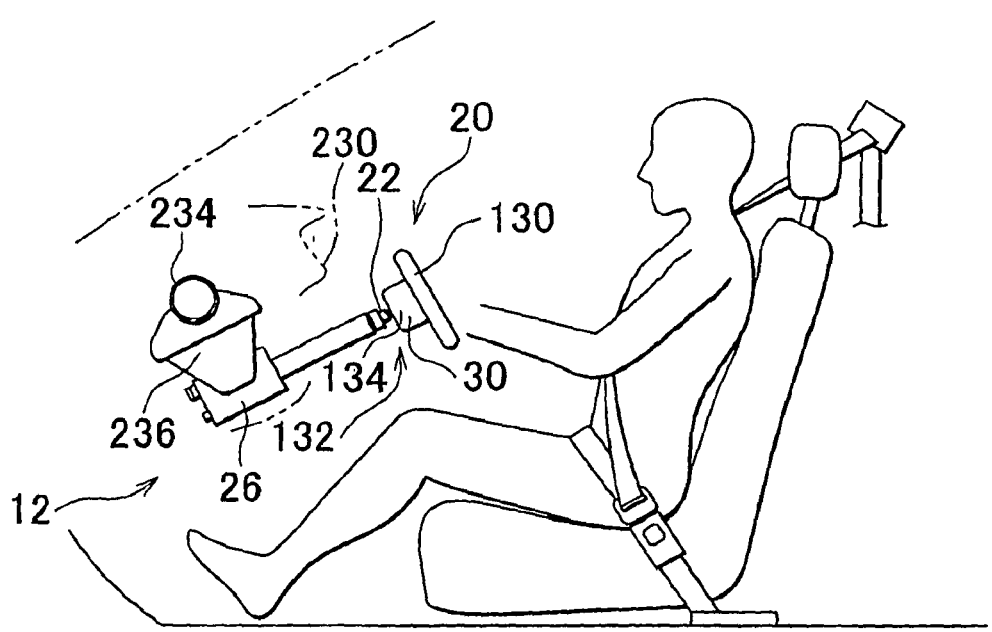
FIG. 10 is a view showing the state in which the operation device is attached to a part of a vehicle body.

As shown in FIG. 10, the operation device 12 is attached at the operation reaction force applying device 26 to the reinforcement 234 of the instrument panel 230, more particularly, to a bracket 236 provided to the reinforcement 234. When attached to the bracket 236, the operation device 12 is in an attitude in which the axis of the shaft 22 is inclined in such a manner that the vehicle-front-side end of the shaft 22 is lower than the vehicle-rear-side end of the shaft 22. The vehicle-rear-side faces of the rim 130 of the steering wheel 20 and the hub portion 134 of the case 132 that houses the airbag device 30 are all inclined in such a manner that the upper portions of the vehicle-rear-side faces lie further toward the front of the vehicle than the lower portions thereof.

In the event of a vehicle collision, the airbag 140 deploys as shown in FIG. 11 in order to alleviate the shock caused when the driver hits the steering wheel 20. More specifically, the inflator 142 generates high-pressure gas which will be introduced into the folded airbag 140 to inflate the airbag 140. Although not shown in the figures, a weak portion is formed in a specific region of an exterior wall of the hub portion 134 of the case 132. When the airbag 140 is inflated, the exterior wall of the hub portion 134 is ruptured at the weak portion to create an opening through which the airbag 140 is deployed into a specified shape.

Figure 11A:
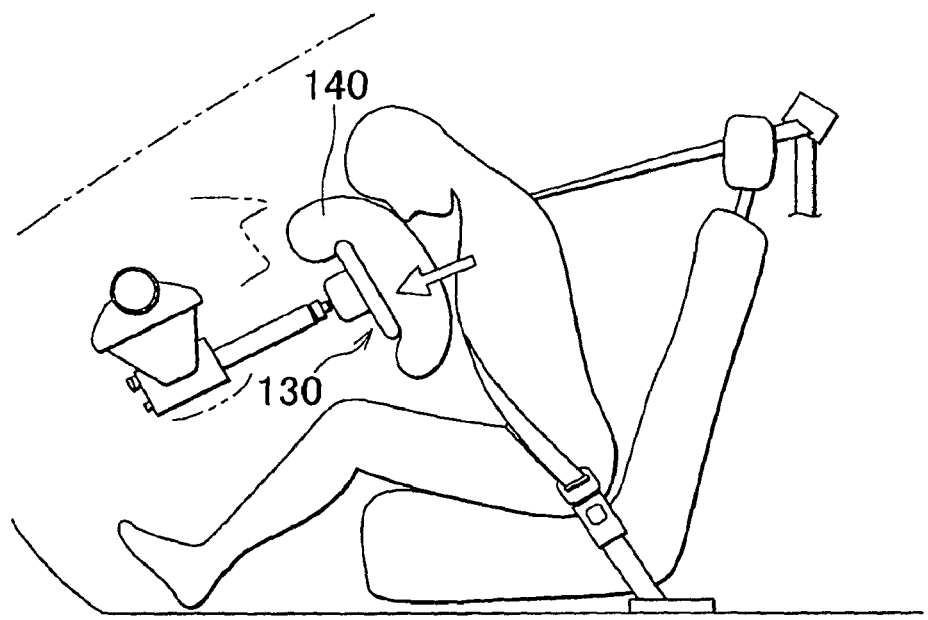
FIG. 11A is a view showing the state in which an airbag is deployed when a steering rim is in a second shape.
Figure 11B:
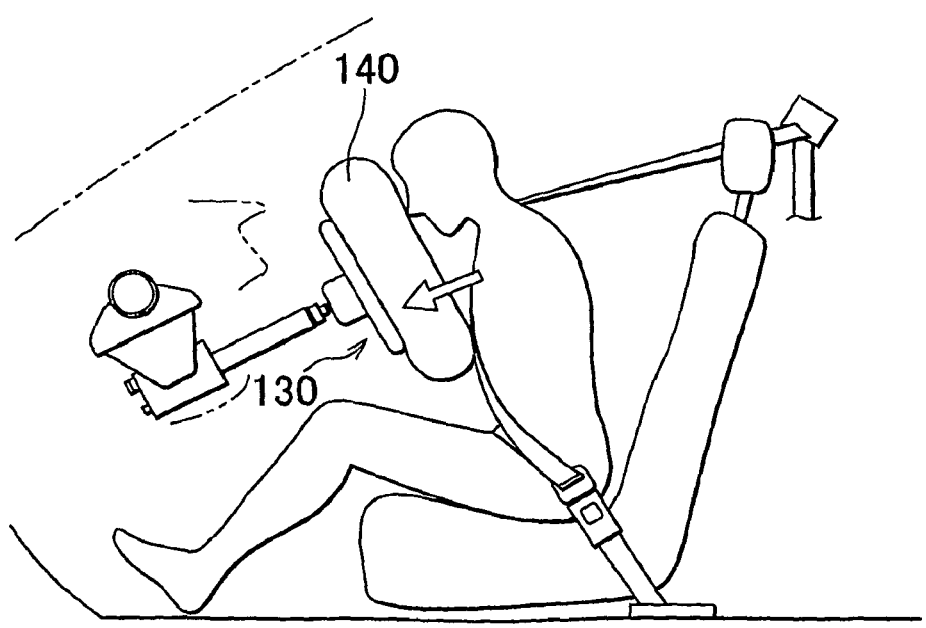
FIG. 11B is a view showing the state in which the airbag is deployed when the steering rim is in a first shape.

FIG. 11A shows the shape of the deployed airbag 140, which is achieved when the upper and lower arc portions 154 and 156 are in the retracted positions and the rim 130 is in the second shape. FIG. 11B shows the shape of the deployed airbag 140, which is achieved when the upper and lower arc portions 154 and 156 are in the expected grip positions and the rim 130 is in the first shape. As can be seen from FIGS. 11A and 11B, when the upper and lower arc portions 154 and 156 are in the expected grip positions and the rim 130 is in an annular shape (FIG. 11B), the driver is securely held by the airbag 140 and the airbag 140 exhibits high shock-relaxing performance. In contrast, if the upper and lower arc portions 154 and 156 are in the retracted and the rim 130 is in a partially annular shape having concave upper portion and lower portion (FIG. 11A), the shock-relaxing performance of the airbag 140 is not exhibited at a sufficient level. This is because, when the driver is held by the airbag 140, the deployed airbag 140 is deformed so that the upper and lower portions of the airbag 140 move toward the front of the vehicle through the dented portions. Thus, in the steering system 10, the rim 130 is kept in the second shape in the normal state in which there is no need to deploy the airbag 140, whereas the rim 130 is brought into the first shape when the airbag 140 needs to be deployed. More specifically, if the upper and lower arc portions 154 and 156 are in the retracted positions when the airbag 140 needs to deployed, the upper and lower arc portions 154 and 156 are brought into the expected grip positions.

Control Over Steering System

As described above, the steering system 10 is controlled by the ECU 18. As shown in FIG. 1, an ignition switch 240 is provided in the vehicle. When the ignition switch 240 is turned on, the electromagnetically-driven clutch 60 of the coupling device 16 is supplied with electric power and the solenoid valve 92 of the operation reaction force applying device 26 is also supplied with electric power. Thus, the wheels 48 are steered by the drive power from the steering motor 44 without using the operating force applied to the steering wheel 20 by the driver.

In such a state, the amount by which the steering wheel 20 is operated from the neutral operation position is detected by the rotational angle sensor 116. The steering device 14 steers the wheels 48 by the amount that corresponds to the operation amount detected by the rotational angle sensor 116. A vehicle speed sensor 242 detects the vehicle speed. The steering amount is adjusted so that the steering amount decreases as the vehicle speed increases. This means that the steering system 10 is a vehicle speed-sensitive steering system. As described above, a reaction force, of which the magnitude corresponds to the operation amount of the steering wheel 20, is applied to the steering wheel 20 using an elastic force of the springs 88 of the operation reaction force applying device 26. In addition, the speed at which the steering wheel 20 is operated is determined based on changes in the operation amount detected by the rotational angle sensor 116. The reaction force against the operation of the steering wheel 20 is adjusted by the power from the reaction force motor 106 so that the reaction force is increased as the speed at which the steering wheel 20 is operated increases.

In such a state, the upper and lower arc portions 154 and 156 are in the retracted positions and the rim 130 is in the second shape. More specifically, the solenoid valve 210 of the fixing mechanism 218 is not supplied with electric power and the tip end portion of the rod 212 of the solenoid valve 210 is passed through the holes 214 and 216 formed in the end face cover members 168 and 170, respectively, by an elastic force of the spring. Further, a fixing mechanism, provided at a connection portion at which the lower arc portion 156 is connected to one of the right arc portion 150 and the left arc portion 152, is in the same state as that of the fixing mechanism 218. Because the structure in which the upper arc portion 156 is connected to the right and left arc portions 150 and 152 is the same as the structure in which the lower arc portion 156 is connected to the right and left arc portions 150 and 152, descriptions concerning the devices and mechanisms included in the lower arc portion 156 will not be provided below.

If, for example, the steering motor 44 malfunctions, supply of electric power to the electromagnetically-driven clutch 60 and the solenoid valve 92 is stopped. When supply of electric power to the electromagnetically-driven clutch 60 and the solenoid valve 92 is stopped, some types of operation reaction force applying devices stop application of a reaction force and the operation force applied to the steering wheel 20 can be transferred to the steering device 14 via the belt 64 and the wire 70. This makes it possible to steer the wheels 48 using the operation force. In addition, the limitation on the operation range imposed by the operation range limiting mechanism is cancelled, and, therefore, the operation range of the steering wheel 20 is increased.

In such a case, in order to ensure sufficient operability of the steering wheel 20, the upper and lower arc portions 154 and 156 may be moved from the retracted positions to the expected grip positions, whereby the rim 130 is brought from the second shape into the first shape. More specifically, if, for example, the steering motor 44 malfunctions, electric power supply to the solenoid valve 210 of the fixing mechanism 218 is started and the tip end portion of the rod 212 of the solenoid valve 210 is removed from the holes 214 and 216 formed in the end face cover members 168 and 170, respectively. In addition, the upper arc portion 154 pivots about the axis using the drive power from the electromagnetically-driven motor 182 of the rim drive device 180. In accordance with the pivot motion of the upper arc portion 154, electric power supply to the solenoid valve 210 of the fixing mechanism 218 is stopped. In addition, the tip end portion of the rod 212 of the solenoid valve 210 passes through the hole 216 of the end face cover member 170 and is pushed against the face of the end face cover member 168 by an elastic force of the spring. When the rim 130 is brought into the annular first shape, the tip end portion of the rod 212 of the solenoid valve 210 is passed through the hole 220 of the end face cover member 168 by an elastic force of the spring. In the steering system 10, an operation range-based control is executed to change the positions of the upper and lower arc portions 154 and 156 between the retracted positions and the expected grip positions based on the operation range of the steering wheel 20, whereby the shape of the rim 130 is changed. This means that the ECU 18 includes an operation range-based control unit. The rim drive device 180 causes the upper arc portion 154 to pivot toward the front of the vehicle, i.e., in such a manner that the upper arc portion 154 moves away from the driver.

In the event of a vehicle collision, a collision sensor 244, provided in a front portion of the vehicle, detects that the collision has occurred, and the airbag device 30 is operated in response to the detection of the collision. Namely, the airbag 140 is deployed by the inflator 142, thereby effectively relaxing the shock of a secondary collision of the driver with the steering wheel 20. In such a case, in order to allow the airbag 140 to exhibit its shock-relaxing performance at a sufficient level, the positions of the upper and lower arc portions 154 and 156 are changed from the retracted positions to the expected grip positions, whereby the shape of the rim 130 is changed from the second shape into the first shape. More specifically, the fixing mechanism 218, the rim drive device 180, etc. are operated as in the operation range-based control described above. Because the airbag 140 is deployed considerably quickly, the magnitude of electric current supplied to the electromagnetically-driven motor 182 is adjusted so that the upper arc portion 154 pivots about the axis at a speed higher than that in the operation range-based control. As described above, in the steering system 10, when the airbag 140 needs to be deployed, an airbag deployment control is executed to change the positions of the upper and lower arc portions 154 and 156 from the retracted positions to the expected grip positions, thus changing the shape of the rim 130 from the second shape into the annular first shape. This means that the ECU 18 includes an airbag deployment-time control unit.

Modified Examples of the Embodiment of the Invention

Hereafter, steering systems according to modified examples of the embodiment of the invention, more specifically, steering wheels, which serve as the steering operation members, according to modified examples of the embodiment of the invention will be described below. In the modified examples described below, the components that are the same as those in the above-described embodiment or the components that have the same functions as those in the above-described embodiment will be denoted by the same reference numerals.

Figure 12:
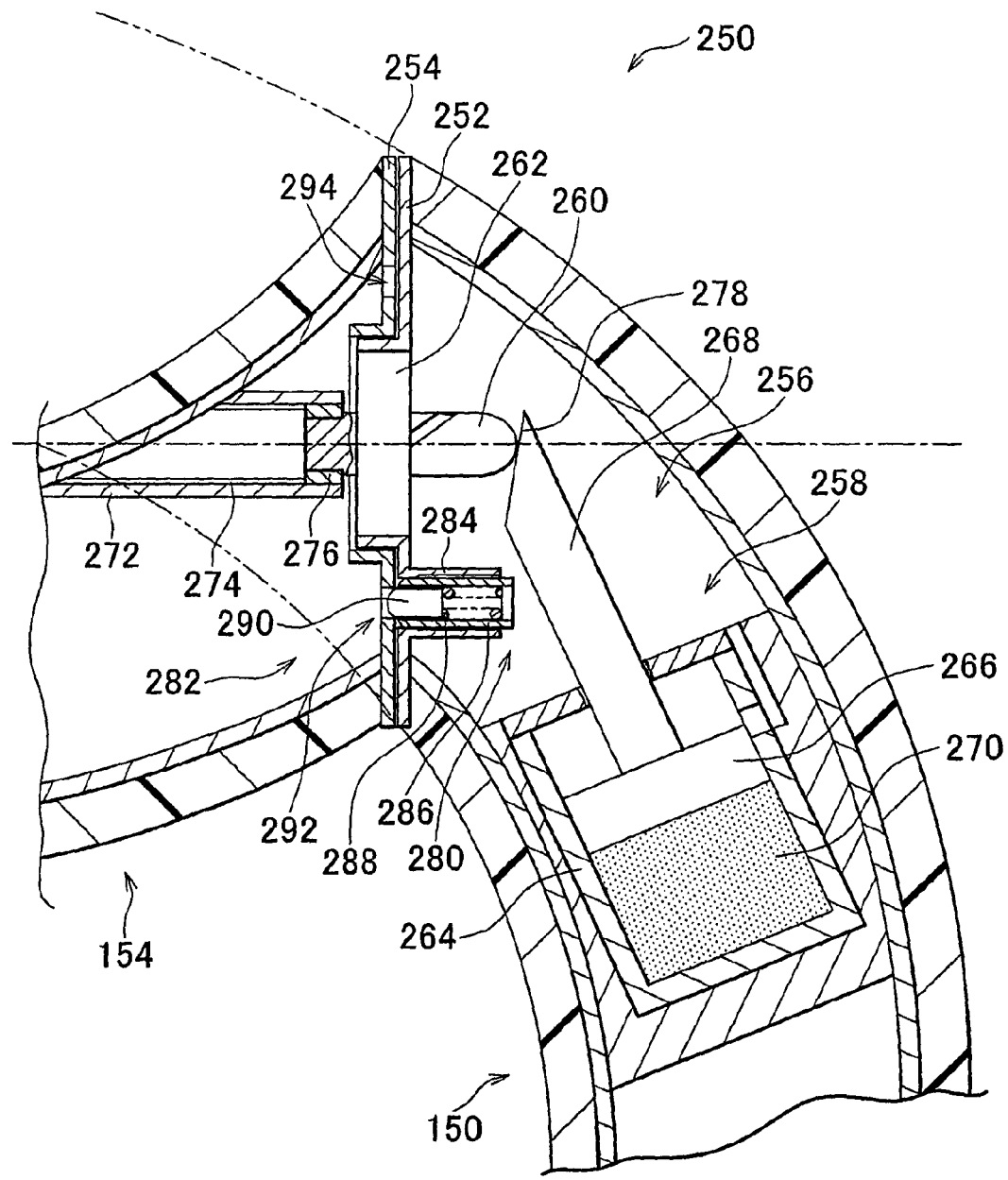
FIG. 12 is an enlarged cross-sectional view showing a connection portion at which the upper arc portion and the right arc portion are connected to each other according to a modified example of the embodiment of the invention.

The structure shown in FIG. 12 may be employed as the structure in which the upper arc portion 154 is connected to the right and left arc portions 150 and 152 and the structure in which the lower arc portion 156 is connected to the right and left arc portions 150 and 152. In the modified examples described below, the structure in which the arc portions 150 and 156 are connected to each other, the structure in which the arc portions 156 and 152 are connected to each other, the structure in which the arc portions 152 and 154 are connected to each other and the structure in which the arc portions 154 and 150 are connected to each other are identical to one another. Thus, the structure in which the upper arc portion 154 and the right arc portion 150 are connected to each other will be described as a representative example.

In a steering wheel 250 according to a modified example shown in FIG. 12, an end face cover member 252 having the same structure as that of the end face cover member 164 according to the above-described embodiment is fixed to the upper end face of the right arc portion 150, and an end face cover member 254 having the same structure as that of the end face cover member 160 according to the above-described embodiment is fixed to the right end face of the upper arc portion 154. A shaft portion of the end face cover member 252 is fitted into a bearing portion of the end face cover member 254 in such a manner that the shaft portion is rotatable about the axis. The end face cover members 252 and 254, etc. constitute a rim shape changing mechanism.

The steering wheel 250 includes a rim drive device 256 that drives the upper arc portion 154 using high-pressure gas instead of using the electromagnetically-driven motor. The rim drive device 256 includes a cylinder device 258 provided within the right arc portion 150, a threaded rod 260 having an external thread formed on its outer peripheral portion and a nut 262 that retains bearing balls and that is screwed with the threaded rod 260. The cylinder device 258 includes a cylinder 264 fixed within the right arc portion 150, a piston 266 that is slidably fitted within the cylinder 264, a piston rod 268 that is connected at one end to the piston 266 and that protrudes at the other end toward the threaded rod 260, and an explosive 270 filled in a space defined by the cylinder 264 and the face of the piston 266, to which the piston rod 268 is not connected. The threaded rod 260 is fitted into a holding sleeve 272 that is provided within the upper arc portion 154 and that extends along the axis. Paired guide grooves 274, which extend along the axis, are formed in the inner wall face of the holding sleeve 272, and paired keys 276 formed at one end portion of the threaded rod 260 are fitted into the respective guide grooves 274. The guide grooves 274 and the keys 276 allow the threaded rod 260 to move along the axis with respect to the holding sleeve 272 but prevent the threaded rod 260 from rotating about the axis. A slant face 278 is formed at the tip end portion of the piston rod 268 of the cylinder device 258. The slant face 278 is roughly oriented to face the nut 262. The other end portion of the threaded rod 260 is rounded and makes contact with the slant face 278 of the piston rod 268. The nut 262 that is screwed with the threaded rod 260 is immovably fitted to the inner peripheral face of a bearing portion (not shown) of the end face cover member 252 fixed to the upper arc portion 154.

The cylinder device 258 is operated when the explosive 270 is ignited by a spark electrode (not shown). When ignited, the explosive 270 generates high-pressure gas, and the piston rod 268 is moved toward the threaded rod 260 by the pressure of the high-pressure gas. Using the slant face 278 of the piston rod 268, the threaded rod 260 is moved along the axis by means of the piston rod 268. In accordance with the movement of the threaded rod 260, the upper arc portion 154 is caused to pivot about the axis with respect to the right arc portion by a ball screw mechanism formed of the threaded rod 260 and the nut 262.

The steering wheel 250 includes a fixing mechanism 282 that uses a plunger 280 instead of a fixing mechanism that uses, for example, a solenoid valve. The plunger 280 includes a housing 286 that is fixed into a boss 284 which extends from the end face cover member 252, a compression coil spring 288 (hereinafter, referred to as a "spring" where appropriate) housed within the housing 286, and a plunger rod 290. The rear end portion of the plunger rod 290 is loosely fitted in the housing 286 in the state where the plunger rod 290 compresses the spring 288. The housing 286 is fitted into the boss 284 in such a manner that the tip end portion of the plunger rod 290 faces the inside of the upper arc portion 154. The tip end portion of the plunger rod 290 is arranged so as to be fitted into a hole 292 formed in the end face cover member 254. The hole 292 is formed at a position at which the tip end portion of the plunger rod 290 is fitted into the hole 292 by an elastic force of the spring 288, when the rim 130 is brought into the second shape. In addition to the hole 292, a hole 294 is also formed in the end face cover member 254 at a position at which the hole 292 will be present if the end face cover member 254 having the hole 292 is rotated 180° about the axis. With this structure, the upper arc portion 154 of the steering wheel 20 is allowed to be fixed in a position where the rim 130 is in the first shape or in a position where the rim 130 is in the second shape. In the steering system that employs the steering wheel 250 according to the modified example, high-pressure gas is used when the shape of the rim 130 is changed from the second shape to the first shape. Accordingly, it is possible to change the shape of the rim quickly. With the system, the airbag deployment-time control is more appropriately executed. Further, the positions of the upper and lower arc portions 154 and 156 may be changed between the expected grip positions and the retracted positions by means of the rim drive device 256. This means that the rim drive device 256 serves as an auxiliary-grip-portion position changing device.

Figure 13:
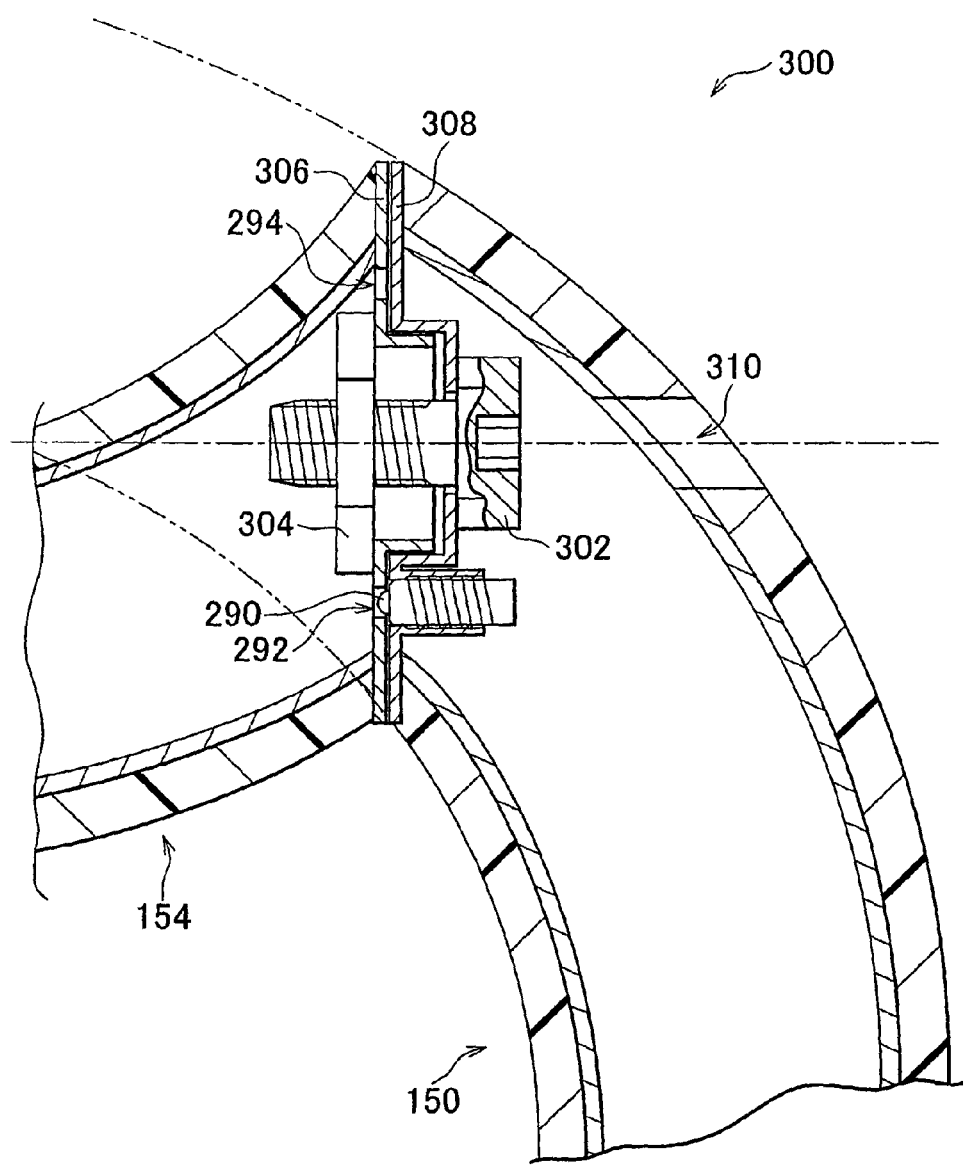
FIG. 13 is an enlarged cross-sectional view showing a connection portion at which the upper arc portion and the right arc portion are connected to each other according to another modified example of the embodiment of the invention.

Alternatively, a fixing mechanism structured as shown in FIG. 13 may be employed. A steering wheel 300 according to another modified example of the embodiment of the invention, shown in FIG. 13, includes a fixing mechanism that uses a bolt 302 and a nut 304, in addition to a fixing mechanism that uses a plunger. An end face cover member 306 fixed to the right end face of the upper arc portion 154 and an end face cover member 308 fixed to the upper end face of the right arc portion 150 are fastened together by means of the plate-shaped nut 304 that is fixed to the inner face of the end face cover member 306 of the upper arc portion 154 and the hexagon socket head bolt 302. A rim drive device is not provided in the steering wheel 300 of this modified example of the embodiment of the invention.

In the steering system that employs the steering wheel 300 according to this modified example of the embodiment of the invention, when the shape of the rim is changed between the first shape and the second shape, the driver inserts a hexagonal wrench through an access opening 310 formed in the right arc portion 150 and loosens the fastening between the bolt 302 and the nut 304. Then, the upper arc portion 154 is caused to pivot about the axis to change the shape of the rim into the first shape or the second shape, after which the driver fastens the bolt 302 and the nut 304 together with the hexagonal wrench. Although the airbag deployment-time control and the operation range-based control described above cannot be executed in the steering system according to this modified example, it is possible for the driver to change the shape of the rim into an intended shape. Furthermore, in this steering system, it is possible to fix the upper arc portion 154 in a position at which the tip end portion of the plunger rod 290 is not fitted into the holes 292 and 294 of the end face cover member 306. Accordingly, it is possible to change the shape of the rim into a shape other than the first and second shapes.

Figure 14:
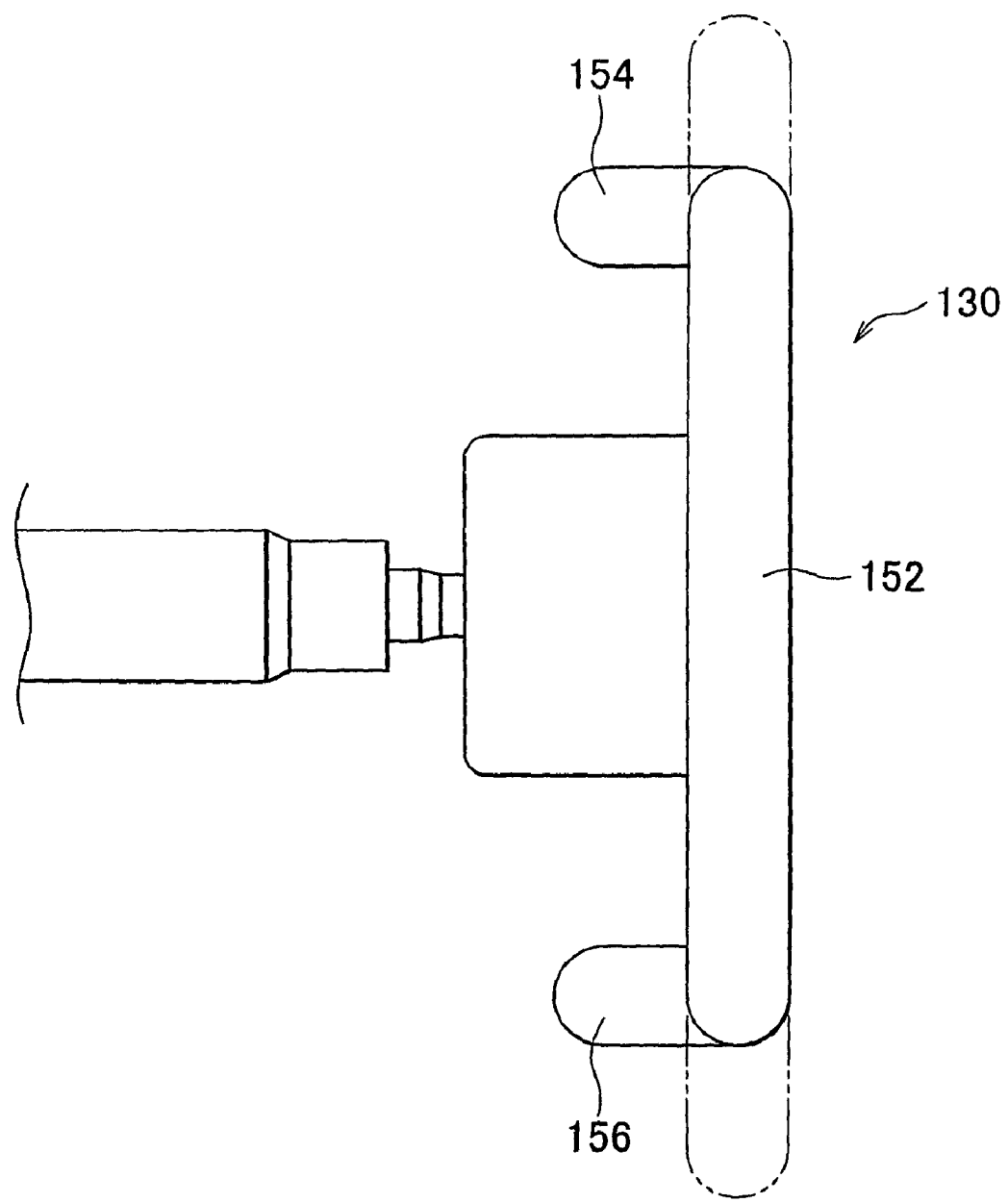
FIG. 14 is a view showing the steering wheel in the second shape when viewed from the left side of the vehicle, in the case where the second shape is the shape of the steering rim that is achieved when the upper arc portion and a lower arc portion are fixed at the positions that are reached when they pivot 90° from the positions thereof when the steering rim is in the first shape.
Figure 15:
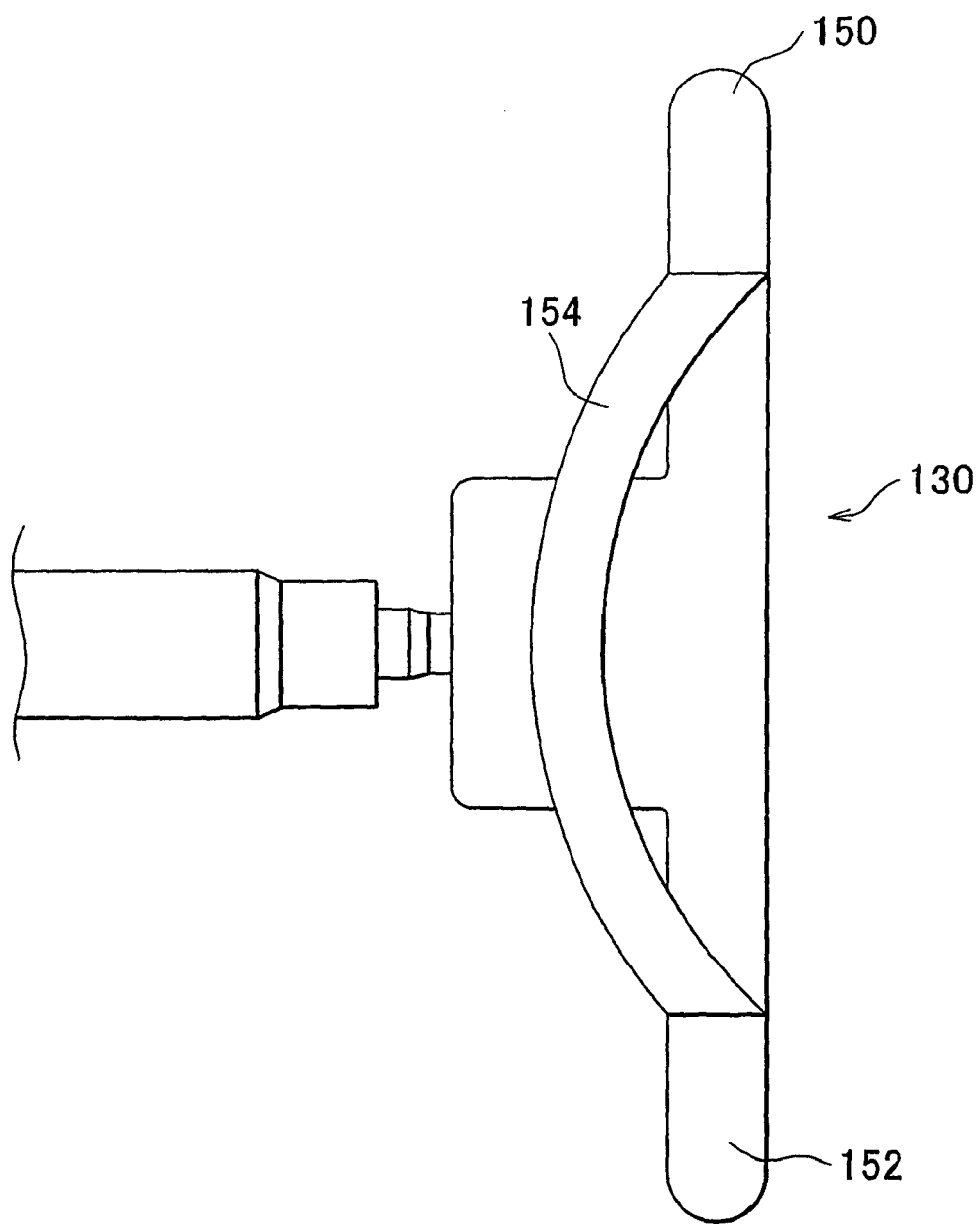
FIG. 15 is a view showing the steering wheel in the second shape when viewed from above, in the case where the second shape is the shape of the steering rim that is achieved when the upper arc portion and the lower arc portion are fixed at the positions that are reached when they pivot 90° from the positions thereof when the steering rim is in the first shape.

The second shape in the embodiment and the modified examples described above is the shape of the rim that is achieved when the upper and lower arc portions 154 and 156 are fixed in the positions that are reached when they pivot 180° from the positions when the rim is in the first shape. Alternatively, the shape of the rim shown (by solid lines) in FIGS. 14 to 16 may be employed as the second shape. More specifically, the second shape may be the shape of the rim that is achieved when the upper and lower arc portions 154 and 156 are fixed in the positions that are reached when they pivot 90° from the positions when the rim is in the first shape. (indicated by chain double-dashed lines). With the steering system in which such a shape is used as the second shape, the shape of the rim is changed from the second shape to the first shape by causing each of the upper and lower arc portions 154 and 156 to pivot 90° instead of 180°. Therefore, it is possible to quickly change the shape of the rim. In the steering wheel described above, the positions of the upper and lower arc portions 154 and 156 when the steering wheel is in an annular shape are used as the expected grip positions (indicated by chain double-dashed lines), and the positions of the upper and lower arc portions 154 and 156, which are reached when they pivot 90° toward of the vehicle from the expected grip positions are used as the retracted positions (indicated by solid lines).

While the invention has been shown and described with respect to the example embodiments, it will be understood by those skilled in the art that various changes and modifications may be made without departing from the scope of the invention as defined in the following claims.

The invention claimed is:

1. A vehicle steering system, comprising:
a steering wheel including a steering rim, a rim shape changing mechanism that allows one portion of the steering rim to move with respect to another portion of the steering rim to change a shape of the steering rim between a first shape, which is an annular shape, and a second shape, which is a partially annular shape, and a rim drive device that includes a drive power source and that operates the one portion of the steering rim using power from the drive power source;
a control unit that controls the rim drive device; and
an airbag device that deploys an airbag toward a driver,
wherein the drive power source is disposed within the another portion of the steering rim,
wherein the steering rim is kept in the second shape in a regular state, and
wherein the control unit includes an airbag deployment-time control unit that controls the rim drive device to change the shape of the steering rim from the second shape to the first shape when the airbag needs to be deployed.

2. The vehicle steering system according to claim 1, wherein the second shape is a partially annular shape in which at least one portion is concave.

3. The vehicle steering system according to claim 2, wherein the rim shape changing mechanism allows the one portion of the steering rim to pivot about an axis that connects end portions of the one portion under a condition where the one portion is held at the end portions by the another portion of the steering rim.

4. The vehicle steering system according to claim 1, wherein the one portion of the steering rim is one of an upper portion or a lower portion of the steering wheel in a neutral operation position.

5. The vehicle steering system according to claim 1, wherein the steering wheel includes a fixing mechanism that fixes the one portion of the steering rim in a position in which the steering rim is in the first shape or in a position in which the steering rim is in the second shape.

6. The steering system according to claim 5, wherein the fixing mechanism includes a solenoid valve with a rod which passes through holes provided in an end face cover member of the one portion of the steering rim.

7. The vehicle steering system according to claim 1, further comprising:
an operation range changing device that changes an operation range of the steering wheel,
wherein:
the steering rim is kept in the second shape when the operation range of the steering wheel is kept small by the operation range changing device; and the control unit includes an operation range-based control unit that controls the rim drive device to change the shape of the steering rim from the second shape to the first shape when the operation range of the steering wheel is increased by the operation range changing device.

8. The vehicle steering system according to claim 1, wherein the rim drive device includes an electromagnetic motor, a reducer which reduces a rotational speed of the motor, and a rim pivot shaft connected to the reducer and which causes the one portion of the steering rim to pivot, and
wherein the reducer is disposed within the another portion of the steering rim.

9. The vehicle steering system according to claim 8, wherein the reducer includes a flexible gear which is splined to an output shaft which is connected to the rim pivot shaft via flexible joint.

10. The vehicle steering system according to claim 1, wherein the rim drive device includes a cylinder device, a threaded rod, and a nut screwed with the threaded rod, and
wherein the cylinder device includes a cylinder, a piston slidably fitted within the cylinder, a piston rod with a first end connected to a first face of the piston and a second end protruding toward the threaded rod, and an explosive filled in a space defined by the cylinder and the second face of the piston opposite the first face.

11. A vehicle steering system, comprising:
a steering operation member that includes an auxiliary grip portion, a position of which is changed between an expected grip position, in which the auxiliary grip portion is expected to be gripped by a driver during a steering operation, and a retracted position, which is reached when the auxiliary grip portion has been retracted from the expected grip position and in which the auxiliary grip portion is not expected to be gripped by the driver during the steering operation;
an auxiliary-grip-portion position changing device that changes the position of the auxiliary grip portion between the expected grip position and the retracted position;
an airbag device that deploys an airbag toward the driver from the steering operation member; and
a control unit that controls an operation of the auxiliary-grip-portion position changing device, and that includes an airbag deployment-time control unit that changes the position of the auxiliary grip portion to the expected grip position if the auxiliary grip portion is in the retracted position when the airbag needs to be deployed,
wherein the auxiliary-grip-portion position changing device is disposed within a portion of the steering operation member other than the auxiliary grip portion.

12. The vehicle steering system according to claim 11, wherein:
the auxiliary grip portion is held at end portions by the portion of the steering operation member other than the auxiliary grip portion in such a manner that the auxiliary grip portion is allowed to pivot about an axis that connects the end portions to each other;
the steering operation member is in an annular shape when the auxiliary grip portion is in the expected grip position; and
the steering operation member is in a partially annular shape in which at least one portion is concave, when the auxiliary grip portion is in the retracted position.

13. The vehicle steering system according to claim 11, wherein, when the auxiliary grip portion is in the expected grip position, the auxiliary grip portion constitutes at least one of an upper portion and a lower portion of the steering operation member in a neutral operation position.

14. The vehicle steering system according to claim 13, wherein:
the auxiliary grip portion of the steering operation member includes a first auxiliary grip portion and a second auxiliary grip portion;
when the first auxiliary grip portion is in the expected grip position, the first auxiliary grip portion constitutes the upper portion of the steering operation member in the neutral operation position; and
when the second auxiliary grip portion is in the expected grip position, the second auxiliary grip portion constitutes the lower portion of the steering operation member in the neutral operation position.

15. The vehicle steering system according to claim 11, further comprising:
an operation range changing device that changes an operation range of the steering operation member,
wherein:
the auxiliary grip portion is kept in the retracted position when the operation range of the steering operation member is kept small by the operation range changing device; and
the control unit includes an operation range-based control unit that changes the position of the auxiliary grip portion from the retracted position to the expected grip position when the operation range of the steering operation member is increased by the operation range changing device.

* * * * *